(12) United States Patent
Shiina et al.

(10) Patent No.: US 8,371,977 B2
(45) Date of Patent: *Feb. 12, 2013

(54) TRANSMISSION RATIO VARIABLE MECHANISM AND MOTOR VEHICLE STEERING SYSTEM INCLUDING THE SAME

(75) Inventors: Akihiko Shiina, Kashihara (JP); Masaki Nakaoka, Aichi (JP); Yasuaki Tsuji, Nara (JP); Yasuhiro Saitou, Okazaki (JP); Sunao Tsuchimochi, Kashiba (JP); Hidetaka Otsuki, Kashiwara (JP); Tomonari Yamakawa, Aichi (JP)

(73) Assignee: JTEKT Corporation, Osaka (JP)

( * ) Notice: Subject to any disclaimer, the term of this patent is extended or adjusted under 35 U.S.C. 154(b) by 205 days.

This patent is subject to a terminal disclaimer.

(21) Appl. No.: 12/738,171

(22) PCT Filed: Oct. 17, 2008

(86) PCT No.: PCT/JP2008/068884
§ 371 (c)(1),
(2), (4) Date: Apr. 15, 2010

(87) PCT Pub. No.: WO2009/054325
PCT Pub. Date: Apr. 30, 2009

(65) Prior Publication Data
US 2010/0218638 A1    Sep. 2, 2010

(30) Foreign Application Priority Data

Oct. 22, 2007 (JP) .................................. 2007-274477
Oct. 22, 2007 (JP) .................................. 2007-274478
Oct. 22, 2007 (JP) .................................. 2007-274479

(51) Int. Cl.
*B62D 11/06* (2006.01)
*B62D 5/04* (2006.01)

(52) U.S. Cl. .......................................... 475/18; 180/444
(58) Field of Classification Search .................... 475/18, 475/21; 74/640; 180/444, 443, 446
See application file for complete search history.

(56) References Cited

U.S. PATENT DOCUMENTS

| 3,935,750 A | 2/1976 | Maroth |
| 3,994,186 A | 11/1976 | Anderson |
| 4,946,428 A | 8/1990 | Barozzi |

(Continued)

FOREIGN PATENT DOCUMENTS

| DE | 10 2004 052 562 B3 | 2/2006 |
| EP | 0 332 450 A2 | 9/1989 |

(Continued)

*Primary Examiner* — David D Le
*Assistant Examiner* — Stacey Fluhart
(74) *Attorney, Agent, or Firm* — Rabin & Berdo, P.C.

(57) ABSTRACT

A transmission ratio variable mechanism is provided with: an input member and an output member capable of rotation about a first axis; an inner race for differentially rotatably coupling to each member; an outer race for rotatably supporting the inner race via a rolling element; and a transmission ratio variable mechanism-use electric motor for rotation-driving the outer race. A second axis which is a center line of the inner race and the outer race is inclined to the first axis. A first concave-convex engaging section for engaging one side end surface of the inner race and a power transmission surface of the input member corresponding to the one end surface are arranged. There is provided a second concave-convex engaging section for engaging the other end surface of the inner race and a power transmission surface of the output member.

20 Claims, 11 Drawing Sheets

U.S. PATENT DOCUMENTS

| | | |
|---|---|---|
| 5,906,250 A | 5/1999 | Haga et al. |
| 5,954,610 A | 9/1999 | Kamimura |
| 6,286,391 B1 | 9/2001 | Gassmann |
| 7,823,686 B2 * | 11/2010 | Arbanas ................. 180/444 |
| 7,824,271 B2 * | 11/2010 | Von Gaisberg-Helfenberg ... 464/160 |
| 8,047,325 B2 * | 11/2011 | Saitou et al. ............. 180/444 |
| 8,146,705 B2 * | 4/2012 | Yamamori et al. ......... 180/444 |
| 2009/0200100 A1 | 8/2009 | Arbanas |

FOREIGN PATENT DOCUMENTS

| | | |
|---|---|---|
| JP | 60-11749 | 1/1985 |
| JP | 60-136642 | 7/1985 |
| JP | 2-225842 | 9/1990 |
| JP | H3-149449 A | 6/1991 |
| JP | 7-56324 B | 6/1995 |
| JP | 9-132153 | 5/1997 |
| JP | 11-1175 | 1/1999 |
| JP | 11-078945 A | 3/1999 |
| JP | 11-315892 | 11/1999 |
| JP | 2004-190846 A | 7/2004 |
| JP | 2006-046405 A | 2/2006 |
| JP | 2006-082718 A | 3/2006 |
| JP | 2006-088726 A | 4/2006 |
| JP | 2006-103392 | 4/2006 |
| JP | 2007-120621 A | 5/2007 |
| JP | 2007-125939 A | 5/2007 |
| JP | 2007-170624 A | 7/2007 |
| JP | 2008-30747 | 2/2008 |
| WO | WO-2006/048095 A1 | 5/2006 |
| WO | WO-2009/054328 A1 | 4/2009 |

* cited by examiner

FIG. 5
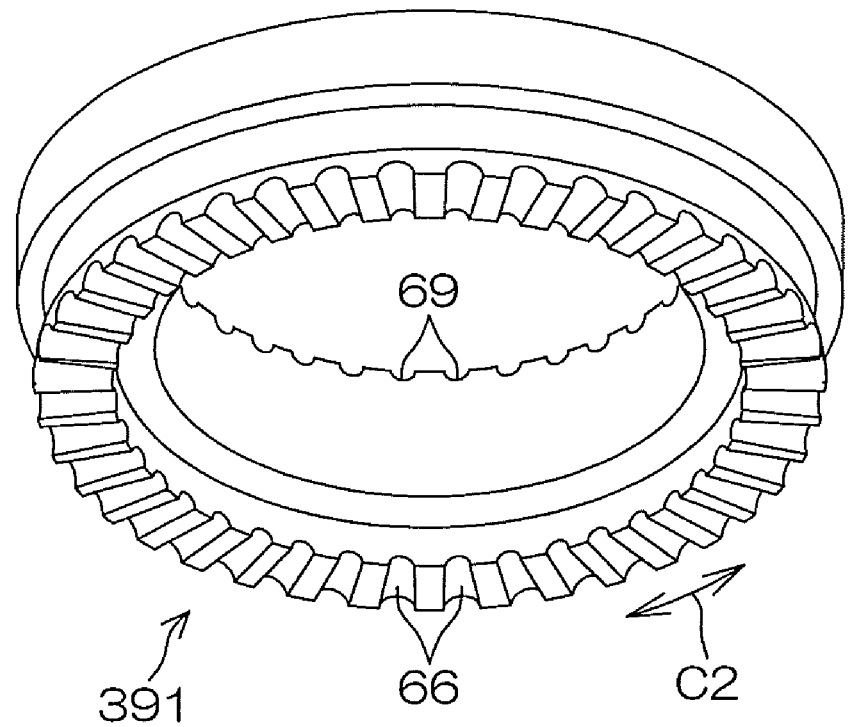
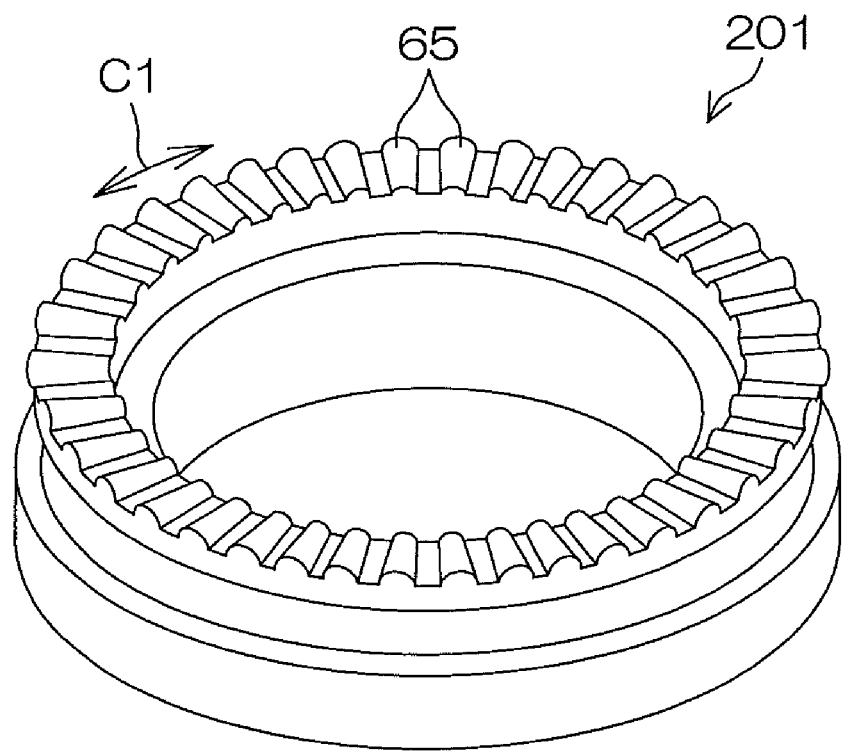

FIG. 6
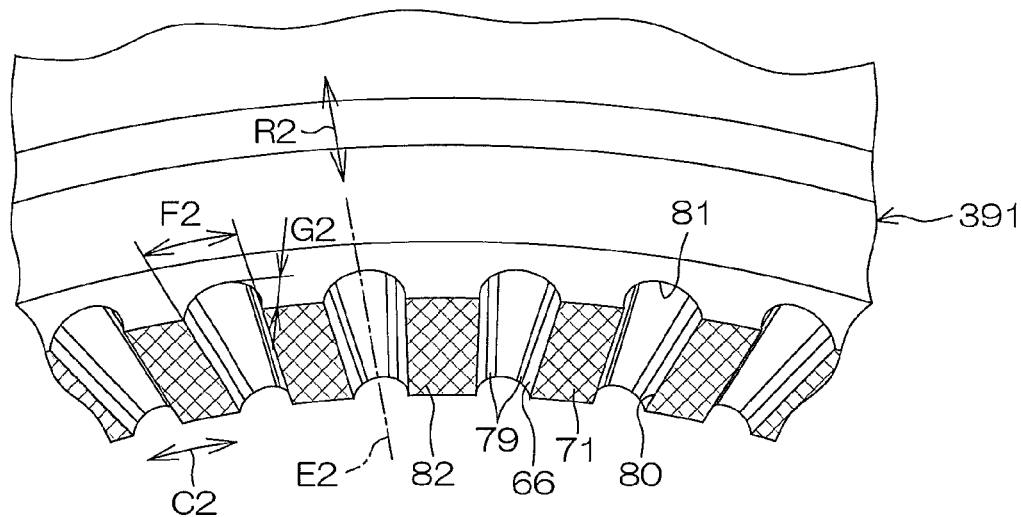
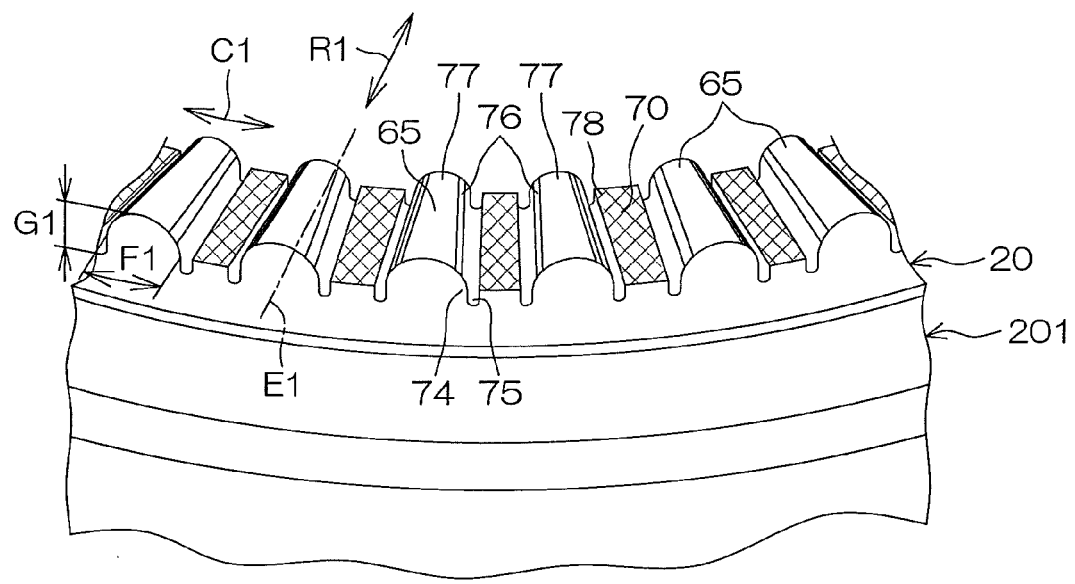

US 8,371,977 B2

TRANSMISSION RATIO VARIABLE MECHANISM AND MOTOR VEHICLE STEERING SYSTEM INCLUDING THE SAME

TECHNICAL FIELD

The present invention relates to a transmission ratio variable mechanism capable of changing a transmission ratio of a steered angle of steered wheels to a steering angle of a steering member, and also relates to a motor vehicle steering system including the same.

BACKGROUND ART

There is known a motor vehicle steering system including a transmission ratio variable mechanism capable of changing a transmission ratio of an output rotation angle to an input rotation angle (for example, see Patent Documents 1 and 2).

In the motor vehicle steering system in Patent Document 1, between an upper steering shaft coupled to a steering wheel and a lower steering shaft coupled to a steering gear, there is arranged a toothed-gear reducer including toothed gears of which tooth sections are formed of "rollers." In each "roller" the both ends are held by a retainer, and are rotatable to a toothed gear main body.

The transmission ratio variable mechanism arranged in this toothed-gear reducer is provided with a first toothed gear of which the rotation is restrained by the upper steering shaft, a fourth toothed gear of which the rotation is restrained by the lower steering shaft, and a swinging toothed gear having an axis inclined to rotation axis of the first and fourth toothed gears. At the both ends of an outer toothed gear section of a swinging toothed gear, there are formed second and third toothed gears, and the second toothed gear is meshed with the first toothed gear and the third toothed gear is meshed with the fourth toothed gear.

Patent Document 1: Japanese Published Unexamined Patent Application No. 2006-82718
Patent Document 2: Japanese Published Unexamined Patent Application No. 2007-170624

DISCLOSURE OF THE INVENTION

Problem to be Solved by the Invention

In the structure in Patent Document 1, at the both ends of the outer toothed gear section of the swinging toothed gear, there are formed the second and third toothed gears. Thus, diameters of the second and third toothed gears are large. Therefore, a radial direction support span is long in an axial direction where the outer toothed gear section is supported by the first and fourth toothed gears from the both ends, and a supporting rigidity of the outer race toothed gear section is decreased. Moreover, as a result of large diameters of the second and third toothed gears, circumferential speeds of the second and third toothed gears when being driven are fast, resulting in a large meshing sound.

Further, in the structure in Patent Document 1, there is arranged an axial direction force imparting member for imparting one of the first and fourth toothed gears with an axial direction force on the swinging toothed gear side. However, the second and third toothed gears in large diameter are formed at the both ends of the outer toothed gear section of the swinging toothed gear. Thus, when the outer toothed gear section having such a large diameter is supported by the first and fourth toothed gears from the both sides in the axial direction, the support span with respect to the radial direction becomes long. Thus, a deformation of the swinging toothed gear becomes large by the axial direction force. As a result, a biasing force acted on the meshing section between the toothed gears meshed to each other is weakened.

Moreover, in the structure in Patent Document 1, in addition to a need for using the "rollers" equal in number to those of the teeth, there is a need for using the retainer. Thus, the number of components is made large. When the number of components is large, it takes time and effort to assemble. Further, it takes time and effort to secure sufficient assembly accuracy.

The present invention has been achieved in view of these circumstances, and an object thereof is to provide a transmission ratio variable mechanism capable of increasing the supporting rigidity of the transmission ratio variable mechanism and of decreasing the driving noise, and also to provide a motor vehicle steering system including the same.

Another object of the present invention is to provide a transmission ratio variable mechanism capable of imparting a sufficient preload and a motor vehicle steering system including the same.

Another object of the present invention is to provide a motor vehicle steering system capable of decreasing the number of components and also decreasing time and effort required for assembly.

Means for Solving the Problem

In the following description, reference numerals in parentheses represent reference numerals of the corresponding constituent elements in the following embodiment. However, it is not intended to limit the scope of the claims by these reference numerals.

To achieve the above-described object, a transmission ratio variable mechanism (5) of the present invention is the transmission ratio variable mechanism (5) capable of changing a transmission ratio ($θ2/θ1$) of a steered angle ($θ2$) of steered wheels (4L, 4R) to a steering angle ($θ1$) of a steering member (2), is provided with: an input member (20) and an output member (22) capable of rotation about a first axis (A); a first bearing ring (391), having first and second end surfaces (71, 73), for differentially rotatably coupling the input member (20) and the output member (22); a second bearing ring (392) for rotatably supporting the first bearing ring (391) via a rolling element (393); and an actuator (23) capable of rotation-driving the second bearing ring (392).

A second axis (B) being a center line of the first bearing ring (391) and the second bearing ring (392) is inclined to a first axis (A), the input member (20) and the output member (22) respectively have power transmission surfaces (70, 72) opposite the first and second end surfaces (71, 73) of the first bearing ring (391).

Moreover, a first concave-convex engaging section (64) and a second concave-convex engaging section (67) are arranged for power-transmittably engaging each end surface (71, 73) of the first bearing ring (391) and the power transmission surfaces (70, 72) corresponding to the end surfaces (71, 73). The first concave-convex engaging section (64) and the second concave-convex engaging section (67) include convex portions (65, 68; 65A) arranged on each end surface (71, 73) and on one of the power transmission surfaces (70, 72) corresponding to the end surfaces, and concave portions (66, 69; 66A; 66B) arranged on an alternate surface and engaged with the convex portions.

According to the configuration, the input member (20), the first bearing ring (391), and the output member (22) are aligned in a direction in which the first axis (A) extends. Thus, the transmission ratio variable mechanism (5) can be made compact with respect to radial directions (R1, R2) of the input member (20) and the output member (22). As a result, the transmission ratio variable mechanism (5) can be made more compact.

Further, the first concave-convex engaging section (64) and the second concave-convex engaging section (67) are arranged on a side of the first bearing ring (391). The first bearing ring (391) is supported by the input member (20) and the output member (22) from both sides of the axial direction. Thereby, a support structure of the first bearing ring (391) can be decreased in size in the radial direction. Thereby, the supporting rigidity of the first bearing ring (391) also can be increased. A convex portion or a concave portion of the first concave-convex engaging section (64) and the second concave-convex engaging section (67) are arranged on a side of the first bearing ring (391). Thereby, the circumferential speed of driving the convex portion or the concave portion arranged in the first bearing ring (391) can be decreased. Thus, an engaging noise generated between the first concave-convex engaging section (64) and the second concave-convex engaging section (67) can be decreased.

In the present invention, the actuator may include an electric motor (23). The electric motor (23) may include a rotor (231) for corotatably holding the second bearing ring (392) and capable of rotation about the first axis (A). In this case, the second bearing ring (392) can be surrounded by the rotor (231). Thus, the rotor (231), the first concave-convex engaging section (64), and the second concave-convex engaging section (67) can be placed at a position overlapping with respect to a direction in which the first axis (A) extends, thereby achieving further compactness of the device.

The rotor (231) is preferably formed in a tubular shape surrounding the first concave-convex engaging section (64) and the second concave-convex engaging section (67). In this case, the rotor (231) may be used as a soundproof wall. Thus, it is possible to inhibit an engaging noise generated between the first concave-convex engaging section (64) and the second concave-convex engaging section (67) from being transmitted to the outside of the rotor (231). As a result, noise can be further decreased.

Moreover, in the present invention, there is a case that the rotor (231) is formed with an inclined hole (63), having a center line along the second axis (B), for holding the second bearing ring (392). In this case, the inclined hole (63) of the rotor (231) is caused to hold the second bearing ring (392), and thereby, the second axis (B) as a center line of the second bearing ring (392) can be inclined to the first axis (A).

There is a configuration that the rotor (231) is both-end supported by a second bearing (32) and a fourth bearing (34) held by a housing (24). The first bearing ring (391) is placed between the second bearing (32) and the fourth bearing (34) with respect to an axial direction of the rotor (231). In this configuration, the rotor (231) can be both-end supported by a pair of bearings (32, 34). Thus, the supporting rigidity of the rotor (231) can be increased. Moreover, the first bearing ring (391) is placed between the pair of bearings (32, 34). Thus, the rotor (231) for receiving force from the first bearing ring (391) can be firmly supported, thereby the rotor (231) is prevented from runout thereof. As a result, it is possible to contribute to a decrease in noise.

The second bearing (32) and the fourth bearing (34) may movably support the rotor (231) with respect to the axial direction of the rotor (231). In this case, along with the movement of the first bearing ring (391) in the axial direction of the rotor (231), the second bearing ring (392) and the rotor (231) can be moved together in the axial direction with of the rotor (231). As a result, an unnecessary force is prevented from being acted between the first bearing ring (391) and the second bearing ring (392).

In the present invention, it is possible to adopt a structure including: a first shaft (11) inserted through a through hole (202a) formed in the input member (20) and corotatably connected to the input member (20); a second shaft (12) inserted through a through hole (22a) formed in the output member (22) and corotatably connected to the output member (22); and a support mechanism (133) for coaxially, relatively rotatably supporting mutual opposite end sections (11a, 12a) of the first and second shafts (11, 12). In this structure, when the mutual opposite end sections (11a,12a) of the first and second shafts (11,12) are coaxially supported, the mutual coaxiality of the first and second shafts (11,12) can be improved. As a result, the input member (20) and the output member (22) can be prevented from shaft swing with respect to others, and an unexpected change in the state of engagement between the convex portion and the concave portion in each concave-convex engaging section (64, 67) can be inhibited. Thereby an engaging sound is prevented from an increase thereof.

In the present invention, the support mechanism (133) may include: a tubular member (202; 202D) that surrounds the mutual opposite end sections of the first and second shafts (11, 12) and that is corotatably coupled to one of the first and second shafts (11, 12); and a bearing (38), interposed between an alternate one of the first and second shafts (11, 12) and the tubular member (202; 202D), for permitting relative rotation of the both components. In this configuration, the support mechanism (133) can be realized by a simple configuration using the tubular member (202; 202D) and the bearing (38). Moreover, the arrangement of the bearing (38) between the first shaft (11) and the second shaft (12) makes the relative rotation between the first and second shafts (11, 12) smooth.

In the present invention, it is possible to adopt a structure that the transmission ratio variable mechanism (5) includes a biasing member (113) for biasing in a bias direction (H) in which one of the input member (20) and the output member (22) is brought close to an alternate one of the input member (20) and the output member (22), and a preload is imparted to the first concave-convex engaging section (64) and the second concave-convex engaging section (67) by the biasing member (113). According to the structure, in the respective first concave-convex engaging section (64) arranged on a side of the first end surface of the first bearing ring (391) and second concave-convex engaging section (67) arranged on a side of the second end surface, the preload is imparted between the convex portion and the concave portion. Thereby, in each concave-convex engaging section (64, 67), backlash between the convex portion and the concave portion can be prevented from occurring therefrom, and thus, an engaging noise can be decreased.

The biasing member (113) may bias the input member (20) toward the output member (22). In this case, the biasing force of the biasing member (113) can be transmitted in the order of: the input member (20), the first concave-convex engaging section (64) arranged on a side of the first end surface of the first bearing ring (391), the second concave-convex engaging section (67) arranged on a side of the second end surface of the first bearing ring (391), and the output member (22).

In the present invention, the transmission ratio variable mechanism (5) may include a first bearing (31), held by a housing (24; 24C), for rotatably supporting the input member (20), in which the biasing member (113) may bias the input member (20) via the first bearing (31). In this case, the preload can be imparted to the first bearing (31) by the biasing member (113). Thus, an abnormal noise resulting from the bearing (31) can be prevented from being generated therefrom.

The first bearing (31) may be held by a bearing holding hole (134) arranged in the housing (24), and the biasing member (113) may include a screw member (113) engaged with a screw section (134a) formed in the bearing holding hole (134). In this case, the biasing force by the screw member (113) can be adjusted by adjusting an amount of screwing the screw member (113) into the screw section (134a).

In the present invention, the first bearing (31) may include an outer race (312) held rotatably by the bearing holding hole (134) and movably in an axial direction and an inner race (311) that can be rotated and moved together in the axial direction with the input member (20), and the screw member (113) may press against an end surface of the outer race (312). In this case, the biasing force of the screw member (113) can be transmitted to the inner race (311) via the outer race (312). Thus, the preload can be reliably imparted to the first bearing (31).

In the present invention, the transmission ratio variable mechanism (5) may include a third bearing (33), held by a housing (24), for rotatably supporting the output member (22), in which movement of the output member (22) in a bias direction may be regulated by the third bearing (33). In this case, a force that the output member (22) makes movement in the bias direction can be received by the third bearing (33). Thus, the preload can be imparted to the third bearing (33).

In the present invention, the input member (20) and the output member (22) may include opposite surfaces that are opposed to each other (136,137) by arranging a gap (138) in a direction parallel to the first axis (A). In this case, when the input member (20) and the output member (22) are brought close to each other by the biasing force of the biasing member (113), contacting of the opposite surfaces can be inhibited.

In the transmission ratio variable mechanism (5) of the present invention, the convex portion and the concave portion of each concave-convex engaging section (64, 67) may be respectively formed integrally with a corresponding member, out of the input member (20), the first bearing ring (391), and the output member (22).

A more specific example is a structure in which: the first convex portion (65) of the first concave-convex engaging section (64) is constantly formed with the power transmission surface of the input member (20); the first concave portion (66) is integrally formed with the first end surface of the first bearing ring (391); the second convex portion (68) of the second concave-convex engaging section (67) is integrally formed with the power transmission surface of the output member (22); and the second concave portion (69) is integrally formed with the second end surface of the first bearing ring (391).

According to the structure, it is not necessary to separately prepare a holding member for holding the convex portion, and thus, the number of components of the transmission ratio variable mechanism (5) can be reduced. Further, as the number of components is small, the assembly of the transmission ratio variable mechanism (5) can be facilitated. Further, the respective convex portion and concave portion of each concave-convex engaging section (64, 67) are integrally formed with the corresponding member, and thus, the accuracy for assembling the mutual components can be more easily enhanced as compared to a case that the convex portion and the concave portion are formed separately of the corresponding member.

The integrated formation by using a single material enables collective formation of each convex portion (each concave portion) and the corresponding member, and thus, the number of manufacturing process can be reduced.

At a base end section of the first convex portion (65) and/or a base end section of the second convex portion (68), a relieving section (75) for avoiding contact with a corresponding concave portion is preferably arranged. For example, the relieving section (75) may be realized by forming a trench that runs through the input member (20) in the radial direction at the base end section of the first convex portion (65), and by forming a trench that runs through the output member (22) in the radial direction at the base end section of the second convex portion (68). With a structure in which the relieving section (75) is arranged, when each of the first and second convex portions (65, 68) is engaged with the corresponding concave portion, undercut in each of the first and second convex portions (65, 68) can be prevented from the occurrence thereof, thereby inhibiting wear of each convex portion and each concave portion.

The present invention may be configured so that the input member (20), the output member (22), and the first bearing ring (391) are respectively annular, and the first convex portion (65), the second convex portion (68), the first concave portion (66), and the second concave portion (69) respectively extend toward radial directions (R1, R2) and have progressively increasing widths (F1, F2) with respect to circumferential directions (C1, C2) from an inside of the radial direction toward an outside thereof. In this case, out of the convex portion and the concave portion, the more outwardly of the radial direction of the corresponding members, the wider the widths (F1, F2) in the circumferential directions (C1, C2). As a result, the sliding of the both concave portions and the convex portions in the mutual engagement can be reduced. Thereby, the durability of the respective concave portion and convex portion can be made longer.

The first convex portion (65) and the first concave portion (66) may include first contact regions (76, 79) that come into contact with each other, the second convex portion (68) and the second concave portion (69) may include second contact regions (76, 79) that come into contact with each other, and near the first contact regions and/or the second contact regions, lubricant holding sections (78, 82) may be respectively arranged. In this case, from near the contact regions, the lubricant can be supplied to the contact regions, and thus, the engagement between the convex portion and the concave portion can be made smoother.

Moreover, with a configuration that the first convex portion (65) and/or the first concave portion (66) are formed by using a low friction material for decreasing a friction resistance. The second convex portion (68) and the second concave portion (69) are formed by using a low friction material for decreasing a friction resistance, the friction resistance generated when the concave portion and the convex portion are engaged can be further decreased.

The motor vehicle steering system of the present invention includes any one of the above-described transmission ratio variable mechanisms (5) and has a steering member coupled to the input member (20) and a turning mechanism coupled to the output member (22). In this case, the operation of the steering member by a driver can be corrected by the transmission ratio variable mechanism (5).

Further, when a steering-assist-force imparting mechanism (19) for imparting a steering assist force is further provided, it becomes possible to reduce a force required by the driver for steering.

The above-described and/or other advantages, characteristics, and effects of the present invention will be made clear from the description of the embodiment below with reference to the attached drawings.

BRIEF DESCRIPTION OF THE DRAWINGS

FIG. 5 is a perspective view of an input member main body and an inner race.

FIG. 6 is a perspective view showing relevant parts of the input member main body and the inner race.

DESCRIPTION OF REFERENCE NUMERALS

1 . . . motor vehicle steering system; 2 . . . steering member; 4R and 4L . . . turning wheel; 5 . . . transmission ratio variable mechanism; 10 . . . turning mechanism; 12 . . . second shaft (input shaft); 13 . . . third shaft (output shaft); 19 . . . steering-assist-force imparting mechanism; 20 . . . input member; 22 . . . output member; 23 . . . transmission ratio variable mechanism-use motor (actuator; electric motor); 24 . . . housing (steering column); 44 . . . torque sensor (torque detecting means); 64 . . . first concave-convex engaging section; 65 and 65A . . . first convex portion; 66, 66A, and 66B . . . first concave portion; 67 . . . second concave-convex engaging section; 68 . . . second convex portion; 69 . . . second concave portion; 70 . . . power transmission surface (of input member); 71 . . . first end surface; 72 . . . power transmission surface (of output member); 73 . . . second end surface; 231 . . . rotor; 391 . . . inner race; 392 . . . outer race; 393 . . . rolling element; A . . . first axis; B . . . second axis; $\theta 1$ . . . steering angle; $\theta 2$ . . . steered angle; and $\theta 2/\theta 1$ . . . transmission ratio.

BEST MODE FOR CARRYING OUT THE INVENTION

Figure 1:
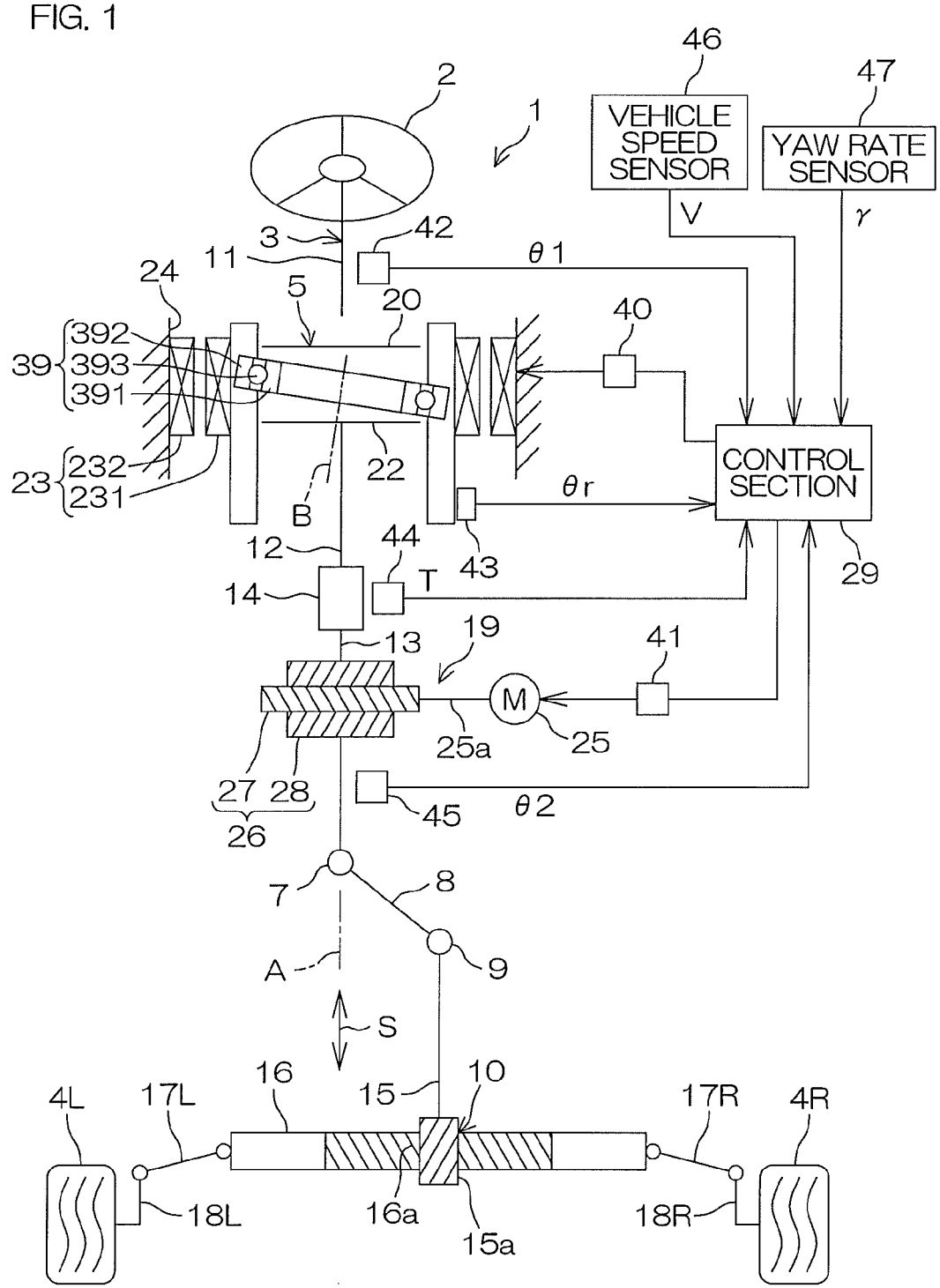
FIG. 1 is a diagram showing a schematic configuration of a motor vehicle steering system including a transmission ratio variable mechanism according to one embodiment of the present invention.

FIG. 1 is a diagram showing a schematic configuration of a motor vehicle steering system 1 including a transmission ratio variable mechanism, according to one embodiment of the present invention.

The motor vehicle steering system 1 applies a steering torque imparted to a steering member 2 such as a steering wheel to each of right and left steered wheels 4R and 4L via a steering shaft 3, etc., as a steering shaft (steering axle), so as to perform turning. The motor vehicle steering system 1 has a VGR (Variable Gear Ratio) function capable of changing a transmission ratio $\theta 2/\theta 1$, which is a ratio of steered angle $\theta 2$ of steered wheels relative to a steering angle $\theta 1$ of a steering member 2.

The motor vehicle steering system 1 includes: the steering member 2; and the steering shaft 3 connected to the steering member 2. The steering shaft 3 includes first to third shafts 11 to 13 placed on the same shaft as one another. A first axis A, which is a center line of each of the first to third shafts 11 to 13, also serves as a rotation axis of each of the first to third shafts 11 to 13.

One end of the first shaft 11 is corotatably coupled with the steering member 2. Herein, the "one end" refers to an upstream end section where the steering member 2 exists, and the "other end" refers to a downstream end section where the steered wheels 4R and 4L exist. The other end of the first shaft 11 and one end of the second shaft 12 are differentially rotatably coupled via a transmission ratio variable mechanism 5. The other end of the second shaft 12 and one end of the third shaft 13 are elastically coupled relatively rotatably and power-transmittably within a predetermined range via a torsion bar 14. The other end of the third shaft 13 is connected via a universal joint 7, an intermediate shaft 8, a universal joint 9, a turning mechanism 10, etc., to the steered wheels 4R and 4L.

The turning mechanism 10 includes: a pinion shaft 15 coupled to the universal joint 9; and a rack shaft 16 that is provided with a rack 16a meshed with a pinion 15a at a leading end of the pinion shaft 15 and that serves as a steered shaft extending in the left and right directions of a motor vehicle. To a pair of end sections of the rack shaft 16, knuckle arms 18R and 18L are coupled via tie rods 17R and 17L, respectively.

With the aforementioned configuration, the rotation of the steering member 2 is transmitted to the turning mechanism 10 via the steering shaft 3, etc. In the turning mechanism 10, the rotation of the pinion 15a is converted into axial direction motion of the rack shaft 16. The axial direction motion of the rack shaft 16 is transmitted to the corresponding knuckle arms 18R and 18L via each of the tie rods 17R and 17L. As a result, the knuckle arms 18R and 18L are respectively pivoted. Thereby, the corresponding wheels 4R and 4L coupled to each of the knuckle arms 18R and 18L are steered and oriented, respectively.

The transmission ratio variable mechanism 5 is for changing a rotation transmission ratio (transmission ratio $\theta 2/\theta 1$) between the first and second shafts 11 and 12 of the steering shaft 3. The transmission ratio variable mechanism 5 includes: an input member 20 arranged at the other end of the first shaft 11; an output member 22 arranged at one end of the second shaft 12; and a bearing ring unit 39 interposed between the input member 20 and the output member 22.

The input member 20 is coupled coaxially and corotatably to the steering member 2 and the first shaft 11, and the output member 22 is coupled coaxially and corotatably to the second shaft 12. The first axis A serves also a center line and a rotation axis of the input member 20 and the output member 22.

The output member 22 is connected via the second shaft 12, the turning mechanism 10, etc., to the steered wheels 4R and 4L.

The bearing ring unit 39 includes an inner race 391 as a first bearing ring, an outer race as a second bearing ring, and a rolling element 393 interposed between the inner race 391 and the outer race, whereby a four-point contact bearing is configured.

Examples of the rolling element 393 include a ball, a cylindrical roller, a needle roller, and a tapered roller. The rolling element may be installed in a single row or installed in a double row. When installed in a double row, the inner race 391 can be prevented from excess inclination. An example of the rolling element 393 in a double row includes a double-row angular contact bearing.

The inner race 391 is for differentially rotatably coupling the input member 20 and the output member 22. The inner race 391 and the outer race include a second axis B as a center line inclined to the first axis A. The inner race 391, which is rotatably supported to the outer race, as a second bearing ring, via the rolling element 393, is rotatable about the second axis B. Moreover, the outer race, along with driving of a transmission ratio variable mechanism-use motor 23 as an electric motor for driving the outer race, is rotatable about the first axis A. The inner race 391 and the outer race are capable of coriolis motion (wobbling) about the first axis A.

The transmission ratio variable mechanism-use motor 23 is placed outward in a radial direction about the first axis A of the bearing ring unit 39. The transmission ratio variable mechanism-use motor 23 changes the number of rotations of the outer race about the first axis A thereby to change the transmission ratio $\theta 2/\theta 1$.

The transmission ratio variable mechanism-use motor 23 is a brushless motor placed coaxially to the steering shaft 3, for example, and includes a rotor 231 for holding the bearing ring unit 39 and a stator 232 that surrounds the rotor 231 and that is fixed to a housing 24 as a steering column. The rotor 231 is designed to rotate about the first axis A.

The motor vehicle steering system 1 is provided with a steering-assist-force imparting mechanism 19 for imparting the steering shaft 3 with a steering assist force. The steering-assist-force imparting mechanism 19 includes: the second shaft 12 as an input shaft connected to the output member 22 of the transmission ratio variable mechanism 5; the third shaft 13 as an output shaft connected to the turning mechanism 10; a torque sensor 44, described later, for detecting torque that is transmitted between the second shaft 12 and the third shaft 13; a steering assisting motor 25 as a steering assisting actuator; and a reduction gear mechanism 26 interposed between the steering assisting motor 25 and the third shaft 13.

The steering assisting motor 25 is an electric motor such as a brushless motor. Output of the steering assisting motor 25 is transmitted via the reduction gear mechanism 26 to the third shaft 13.

The reduction gear mechanism 26 is formed by a worm gear mechanism, for example, and includes a worm shaft 27 as a driving toothed gear coupled to the output shaft 25a of the steering assisting motor 25 and a worm gear 28 as a driven toothed gear that is meshed with the worm shaft 27 and coupled corotatably to the third shaft 13. Moreover, the reduction gear mechanism 26 is not limited to the worm gear mechanism, and may be selected from other toothed gear mechanisms such as a parallel-axis gear mechanism using a spur gear or a spiral gear.

The transmission ratio variable mechanism 5 and the steering-assist-force imparting mechanism 19 are arranged in the housing 24, and accommodated within the housing 24. The housing 24 is placed within a passenger compartment (cabin) of a motor vehicle. Moreover, the housing 24 may be placed to surround the intermediate shaft 8 or may be placed within an engine room of the motor vehicle.

Driving of the transmission ratio variable mechanism-use motor 23 and the steering assisting motor 25 are respectively controlled by a control section 29 having a CPU, a RAM, and a ROM. The control section 29 is connected via a driving circuit 40 to the transmission ratio variable mechanism-use motor 23, and also, connected via a driving circuit 41 to the steering assisting motor 25.

The control section 29 is connected with a steering angle sensor 42, a motor resolver 43 as a rotation-angle detecting means for detecting the rotation angle of the transmission ratio variable mechanism-use motor 23, a torque sensor 44 as a torque detecting means, a steered angle sensor 45, a vehicle speed sensor 46, and a yaw rate sensor 47, respectively.

From the steering angle sensor 42, a signal in relation to the rotation angle of the first shaft 11, as a value corresponding to the steering angle $\theta 1$ which is an operation amount from a direct advance position of the steering member 2, is input to the control section 29.

From the motor resolver 43, a signal in relation to a rotation angle $\theta r$ of the rotor 231 of the transmission ratio variable mechanism-use motor 23 is input.

From the torque sensor 44, as a value corresponding to a steering torque T acted on the steering member 2, a signal in relation to torque acted between the second and third shafts 12 and 13 is input.

From the steered angle sensor 45, as a value corresponding to the steered angle $\theta 2$, a signal in relation to the rotation angle of the third shaft 13 is input.

From the vehicle speed sensor 46, a signal in relation to a vehicle speed V is input.

From the yaw rate sensor 47, a signal in relation to a yaw rate $\gamma$ of the motor vehicle is input.

The control section 29 controls driving of the transmission ratio variable mechanism-use motor 23 and the steering assisting motor 25 based on the signals, etc., of the sensors 42 to 47.

With the aforementioned configuration, the output of the transmission ratio variable mechanism 5 is transmitted via the steering-assist-force imparting mechanism 19 to the turning mechanism 10. More specifically, the steering torque input to the steering member 2 is input via the first shaft 11 to the input member 20 of the transmission ratio variable mechanism 5, and then, transmitted from the output member 22 to the second shaft 12 of the steering-assist-force imparting mechanism 19. The steering torque transmitted to the second shaft 12 is transmitted to the torsion bar 14 and the third shaft 13, and after being mixed with the output from the steering assisting motor 25, transmitted via the intermediate shaft 8, etc., to the turning mechanism 10.

Figure 2:
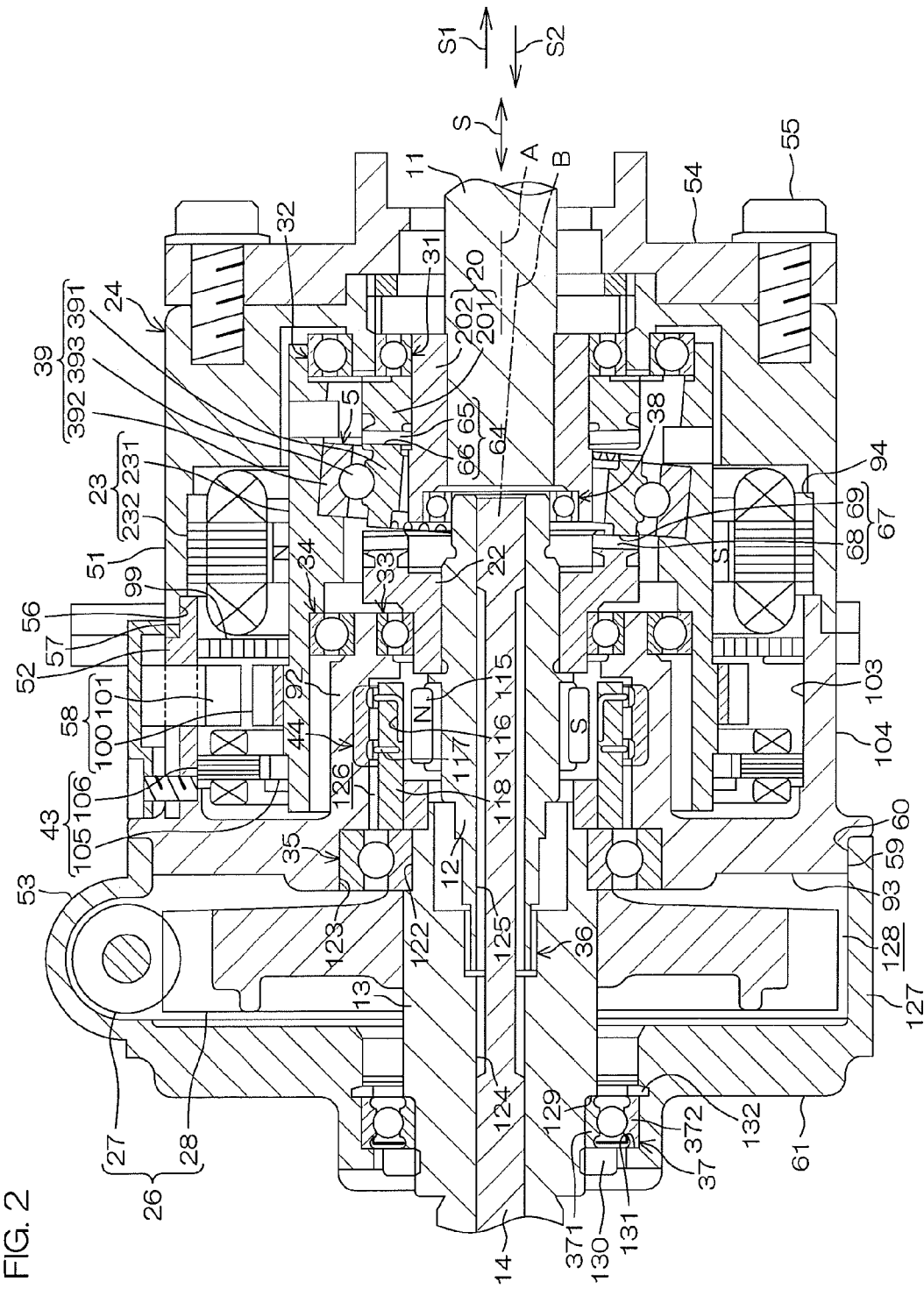
FIG. 2 is a cross-sectional view showing a specific configuration in which a transmission ratio variable mechanism and a steering-assist-force imparting mechanism are accommodated in a housing.

FIG. 2 is a cross-sectional view showing a more specific configuration of the relevant parts in FIG. 1. With reference to FIG. 2, the housing 24 is configured by forming a metal such as an aluminum alloy into a tubular shape, for example, and includes first to third housings 51 to 53. Within the housing 24, first to eighth bearings 31 to 38 are accommodated. The first to fifth bearings 31 to 35 and the seventh and eighth bearings 37 to 38 are each rolling bearings such as an angular contact ball bearing, and the sixth bearing 36 is a rolling bearing such as a needle rolling bearing.

The first housing 51 is formed in a tubular shape and configures a differential mechanism housing for accommodating the transmission ratio variable mechanism 5 as a differential mechanism, and configures a motor housing for accommodating the transmission ratio variable mechanism-use motor 23. One end of the first housing 51 is covered with an end wall member 54. One end of the first housing 51 and the end wall member 54 are fixed to each other by using a screwing member 55 such as a bolt. An inner circumferential surface 56 at the other end of the first housing 51 is fitted with an annular convex portion 57 at one end of the second housing 52. The first and second housings 51 and 52 are fixed to each other by using a screwing member (not shown) such as a bolt.

The second housing 52 is formed in a tubular shape, and configures a sensor housing for accommodating the torque sensor 44 and a resolver housing for accommodating the motor resolver 43. Moreover, the second housing 52 accommodates therein a bus bar 99 (described later) of the transmission ratio variable mechanism-use motor 23 and a lock mechanism 58 for locking the rotor 231 of the transmission ratio variable mechanism-use motor 23. An outer circumferential surface 59 at the other end of the second housing 52 is fitted with an inner circumferential surface 60 at one end of the third housing 53.

The third housing 53 is formed in a tubular shape, and configures a reduction gear mechanism housing for accommodating the reduction gear mechanism 26. At the other end of the third housing 53, there is arranged an end wall section 61. The end wall section 61 is formed in an annular shape, and covers the other end of the third housing 53.

Figure 3:
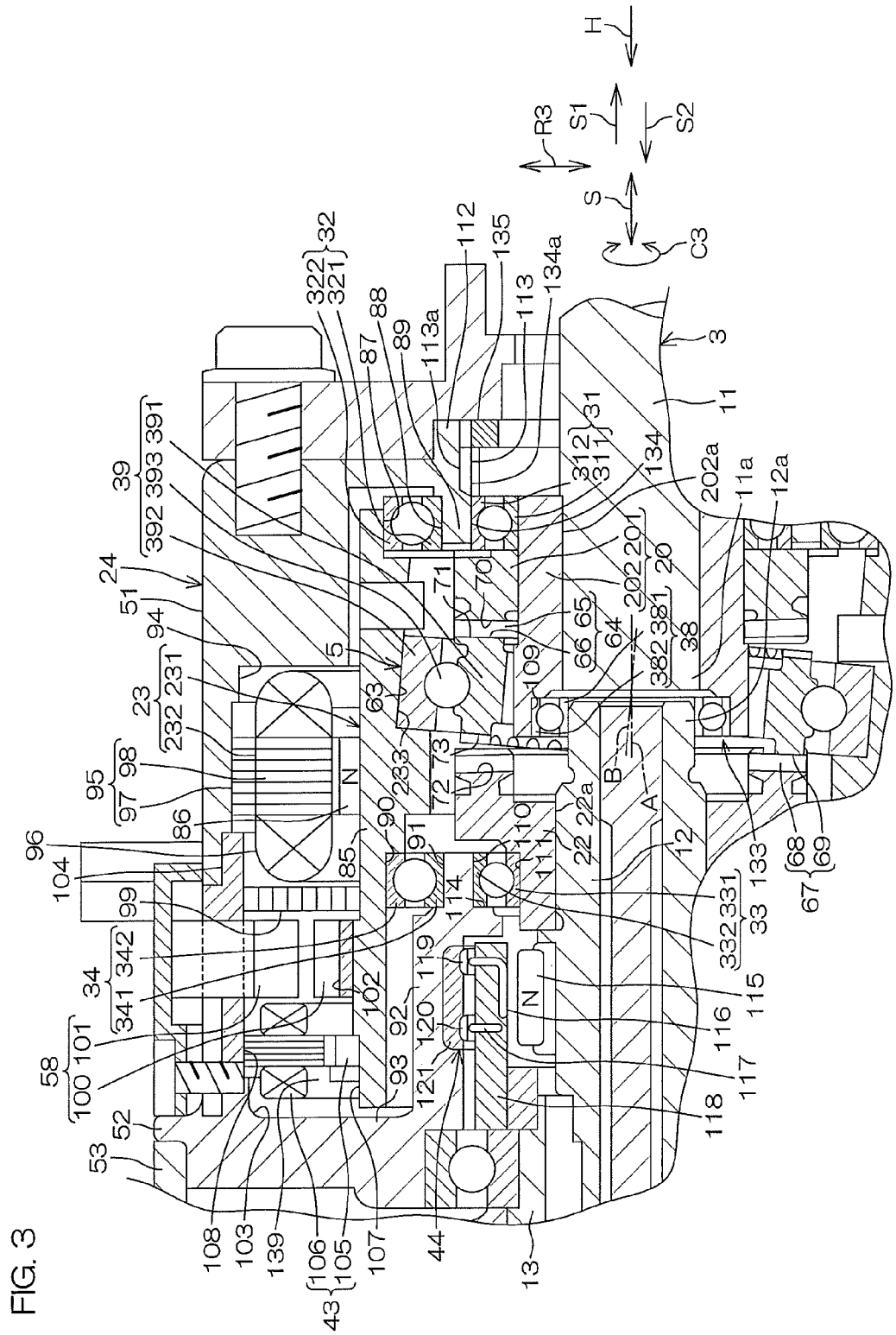
FIG. 3 is an enlarged view of a transmission ratio variable mechanism of FIG. 2 and a surrounding area thereof.

FIG. 3 is an enlarged view of the transmission ratio variable mechanism 5 in FIG. 2 and a surrounding area thereof. With reference to FIG. 3, the input member 20, the output member 22, and the inner race 391 of the transmission ratio variable mechanism 5 are each in an annular shape.

The input member 20 includes an input member main body 201 and a tubular member 202 that is placed inward in a radial direction of the input member main body 201 and that is corotatably coupled to the input member main body 201.

The first shaft 11, which is inserted through a through hole 202a of the tubular member 202, is corotatably coupled to the tubular member 202.

The second shaft 12, which is inserted through a through hole 22a of the output member 22, is corotatably coupled to the output member 22.

Opposite end sections 11a and 12a of the both first shaft 11 and the second shaft 12 are supported coaxially and relatively rotatably by the support mechanism 133. The support mechanism 133 includes the tubular member 202 and the eighth bearing 38. That is, the tubular member 202 configures one portion of the input member 20 and configures one portion of the support mechanism 133.

The tubular member 202 surrounds the respective opposite end sections 11a and 12a of the first and second shafts 11 and 12. One end of the tubular member 202 opposes the first bearing 31 in the radial direction. The other end of the tubular member 202 opposes the opposite end section 12a of the second shaft 12 in the radial direction.

The other end of the tubular member 202 is formed with a bearing holding hole 109, and through the bearing holding hole 109, the opposite end section 12a of the second shaft 12 is inserted. Between the opposite end section 12a and the bearing holding hole 109 of the second shaft 12, there is interposed the eighth bearing 38, which permits relative rotation between the tubular member 202 and the second shaft 12.

Moreover, the tubular member 202 may be corotatably coupled to the opposite end section 12a of the second shaft 12, and also the eighth bearing 38 may be interposed between the tubular member 202 and the opposite end section 11a of the first shaft 11.

The inner race 391 is placed outward in a radial direction of the tubular member 202. The outer race is held corotatably by an inclined hole 63 formed in an inner circumferential section 233 of the rotor 231 of the transmission ratio variable mechanism-use motor 23, and is corotatable with the rotor 231 about the first axis A. The center line of the inclined hole 63 is the second axis B.

Along with the rotation of the rotor 231 about the first axis A, the bearing ring unit 39 performs coriolis motion.

Moreover, the outer race of the bearing ring unit 39 may be coupled differentially rotatably to the input member 20 and the output member 22, and also the inner race 391 may be coupled corotatably to the rotor 231 of the transmission ratio variable mechanism-use motor 23. In this case, the bearing ring unit 39 makes an inner race support type.

Figure 4:
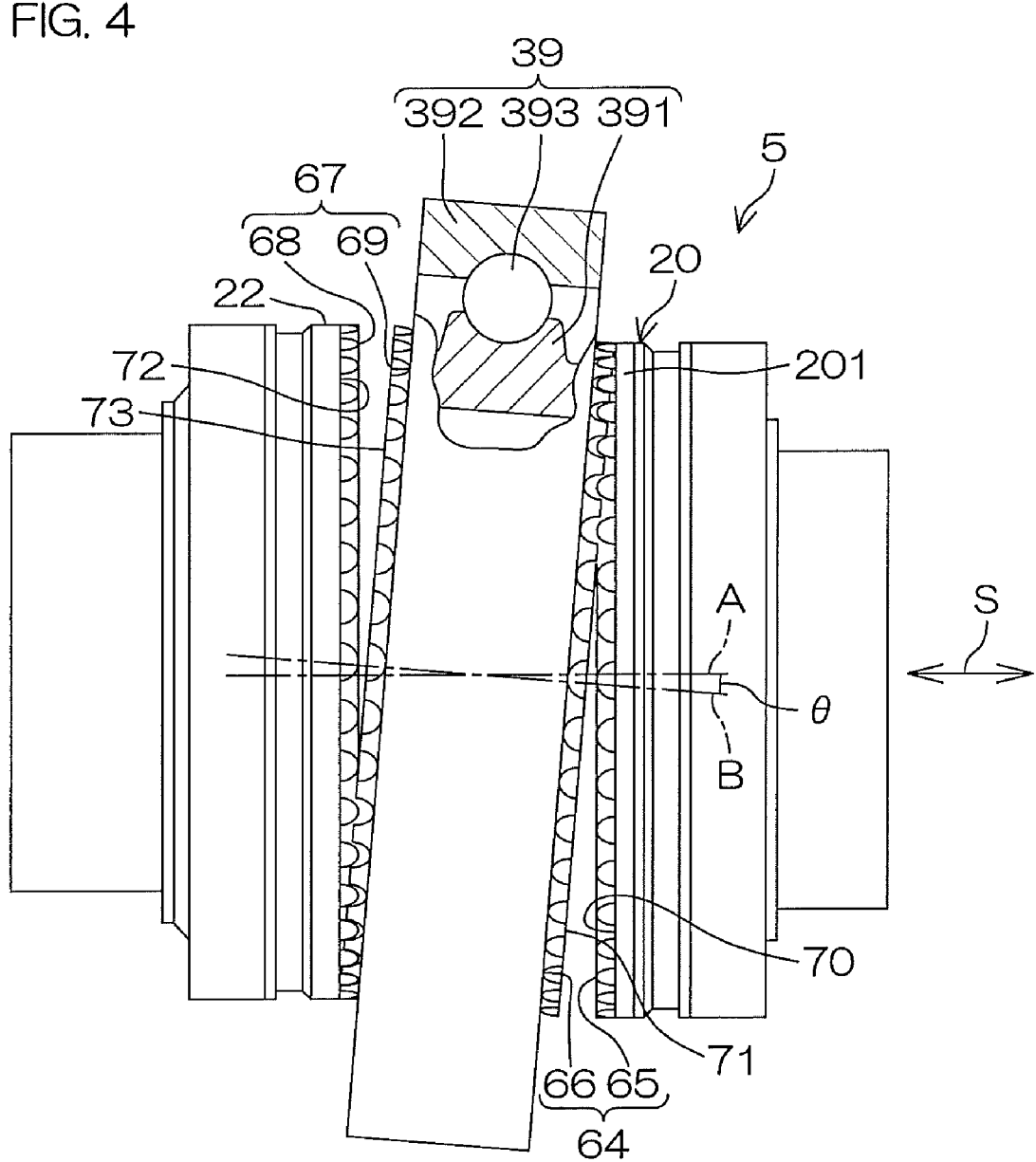
FIG. 4 is a lateral side view showing the transmission ratio variable mechanism of which the one portion is expressed in cross section.

FIG. 4 is a lateral side view of the transmission ratio variable mechanism 5 of which the one portion is expressed in cross section. With reference to FIG. 3 and FIG. 4, when first concave-convex engaging sections 64 are arranged in the respective input member main body 201 and inner race 391, the power can be transmitted between the input member main body 201 and the inner race 391. As second concave-convex engaging sections 67 are arranged in the respective inner race 391 and output member 22, the power can be transmitted between the inner race 391 and the output member 22.

Each first concave-convex engaging section 64 includes a first convex portion 65 formed on a power transmission surface 70 as a one end surface of the input member main body 201 and a first concave portion 66 that is formed on a first end surface 71 as a one end surface of the inner race 391 and that is engaged with the first convex portion 65. The power transmission surface 70 and the first end surface 71 are opposed to each other in an axial direction S of the steering shaft 3. The first concave-convex engaging section 64 power-transmittably engages the power transmission surface 70 and the first end surface 71. Moreover, the first concave portion 66 may be formed in an annular member formed separately of the inner race main body, and the annular member may be corotatably held by the inner race main body. In this case, the inner race main body and the annular member configure an inner race equivalent to the inner race 391. The placement of the first convex portion 65 may be replaced by that of the first concave portion 66.

Each second concave-convex engaging section 67 includes a second convex portion 68 formed on a power transmission surface 72 as a one end surface of the output member 22 and a second concave portion 69 that is formed on a second end surface 73 as the other end surface of the inner race 391 and that is engaged with the second convex portion 68. The power transmission surface 72 and the second end surface 73 are opposed to each other in the axial direction S of the steering shaft 3. The second concave-convex engaging section 67 power-transmittably engages the power transmission surface 72 and the second end surface 73. Moreover, the second concave portion 69 may be formed in an annular member formed separately of the inner race main body, and the annular member may be corotatably held by the inner race main body. In this case, the inner race main body and the annular member configure an inner race equivalent to the inner race 391. The placement of the second convex portion 68 may be replaced by that of the second concave portion 69.

FIG. 5 is a perspective view of the input member main body 201 and the inner race 391. With reference to FIG. 4 and FIG. 5, each first convex portion 65 is formed at regular intervals over the entire circumference of a circumferential direction C1 of the input member 20. Likewise, each first concave portion 66 is formed at regular intervals over the entire circumference of a circumferential direction C2 of the inner race 391.

For example, the number of first convex portions 65 to be formed is 38. The number of first concave portions 66 is different from that of the first convex portions 65. According to a difference between the number of first convex portions 65 and that of first concave portions 66, differential rotation can be generated between the input member main body 201 and the inner race 391.

The second axis B of the inner race 391 is inclined by a predetermined angle θ relative to the first axis A of the input member 20 and the output member 22. Thereby, some first convex portions 65 only out of each first convex portion 65 and some first concave portions 66 out of each first concave portion 66 only are meshed to each other.

FIG. 6 is a perspective view of the relevant parts of the input member main body 201 and the inner race 391. With reference to FIG. 6, each first convex portion 65 is formed integrally, by using a single material, to the input member main body 201 of the input member 20, which is a corresponding member out of the input member 20, the inner race 391, and the output member 22, that is, a member arranged with the first convex portion 65.

The first convex portion 65 and the input member main body 201 are collectively molded. Examples of methods of molding the first convex portion 65 and the input member main body 201 include forging molding; casting molding; sinter molding: injection molding; metal injection molding; and cutting processing. In the metal injection molding, metal powders are mixed with a binder so that injection molding can be performed as in the case of plastic and after the injection molding, the binder is removed by heating, and the resultant material is sintered to a metal single unit.

The first convex portion 65 entirely extends over the power transmission surface 70 with respect to a radial direction R1 of the input member 20, for example, and is formed in a semicircular shape in cross section. The first convex portion 65 increases its cross sectional shape (semicircular shape) when seen from an inside of the radial direction R1 toward an outside thereof. The first convex portion 65 is also in a semicircular shape about a center line E1 flush with the power transmission surface 70 at any position in the radial direction R1. With the aforementioned configuration, the first convex portion 65 progressively increases a width F1 with respect to the circumferential direction C1 of the input member 20 as a corresponding member when seen from the inside of the radial direction R1 toward the outside thereof, and has a progressively increasing protruding amount G1 from the power transmission surface 70.

The base end section 74 of the first convex portion 65 is arranged with relieving sections 75 for avoiding contact with the corresponding first concave portion 66. The relieving sections 75 are each formed at both ends of the first convex portion 65 with respect to the circumferential direction C1, and are configured by a trench allowing penetration of the input member main body 201 in the radial direction R1. The arrangement of each relieving section 75 avoids contact between the first end surface 71 of the first concave portion 66 of the inner race 391 and the first convex portion 65, undercut near the base end section 74 of the first convex portion 65 can be prevented from occurrence thereof.

Moreover, the arrangement of each relieving section 75 inhibits wearing of a metal molding part around each relieving section 75 when the input member main body 201 is molded by using the metal molding.

Figure 7:
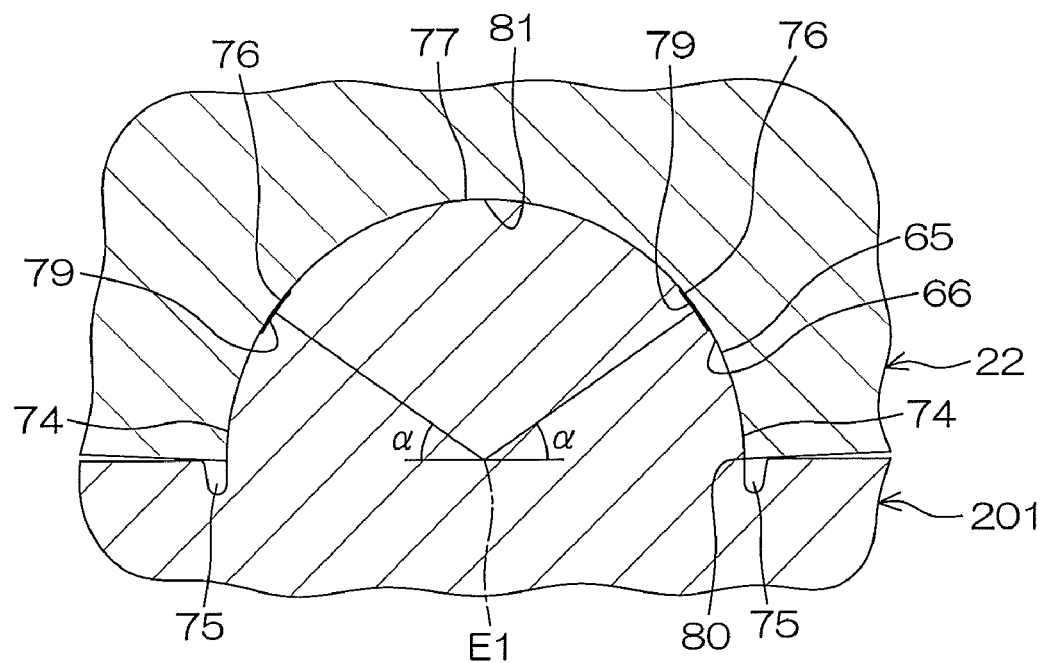
FIG. 7 is a cross-sectional view showing engagement between a first convex portion and a first concave portion.

FIG. 7 is a cross-sectional view showing engagement between the first convex portion 65 and the first concave portion 66. With reference to FIG. 6 and FIG. 7, the first convex portion 65 is configured so that contact regions 76 of its external surface come in contact with a contact region 79 of the corresponding first concave portion 66. Each contact region 76 is arranged at a portion between the base end section 74 and the leading end section 77 of the first convex portion 65.

The contact regions 76 are formed on both sides of the leading end section 77. The position and the width of each contact region 76 are determined based on a contact angle α of the first convex portion 65. The contact angle α of the contact region 76 of the first convex portion 65 is set within a range of between 15 and 75 degrees, for example.

The contact region 76 is formed by using a low friction material that is for decreasing friction resistance. The low friction material contains a material having a friction coefficient lower than that of a material of the first convex portion 65. Examples of the low friction material include diamond-like carbon (DLC), a nitride obtained by performing a nitriding treatment on the first convex portion 65, a material obtained by performing a curing coat treatment, and a low-μ coating material.

With reference to FIG. 6, a lubricant holding section 78 is formed at a portion near the contact region 76, out of the input member main body 201. The lubricant holding section 78 is for holding lubricant such as grease, and is formed on the power transmission surface 70 of the input member main body 201, for example.

The lubricant holding section 78 is formed by knurl, cross hatch, dimple, etc., for example, formed on the power transmission surface 70 to have a roughened surface. The lubricant holding section 78 is formed by performing press molding, texturing, or shot peening processing on the power transmission surface 70.

The lubricant holding section 78 is formed in at least one portion of a flat portion where the first convex portion 65 is not formed, out of the power transmission surface 70. Moreover, the lubricant holding section 78 may be formed in a portion where the contact region 76 is not formed, out of the first convex portion 65.

Each first concave portion 66 is formed integrally, by using a single material, to the inner race 391 as a corresponding member out of the input member 20, the inner race 391, and the output member 22, that is, a member arranged with the first concave portion 66.

The first concave portion 66 is molded in a manner similar to the way that the above-described first convex portion 65 is molded.

The first concave portion 66 is formed in a shape approximately matching that of the first convex portion 65. Specifically, the first concave portion 66 entirely extends over the first end surface 71 with respect to a radial direction R2 of the inner race 391, and is formed in a semicircular shape in cross section, for example. The first convex portion 66 increases its cross sectional shape (semicircular shape) when seen from the inside of the radial direction R2 toward the outside thereof. The first concave portion 66 is formed in a semicircular shape about a center line E2 flush with the first end surface 71 at any position in the radial direction R2. With the aforementioned configuration, the first concave portion 66 progressively increases a width F2 with respect to the circumferential direction C2 of the inner race 391 as a corresponding member from the inside of the radial direction R2 toward the outside thereof, and has a progressively increasing protruding amount G2 from the first end surface 71.

With reference to FIG. 6 and FIG. 7, the first concave portion 66 is configured so that the contact regions 79 on its surface come in contact with the contact region 76 of the corresponding first convex portion 65. Each contact region 79 is arranged in a portion between an opening 80 and a bottom 81 of the first concave portion 66. The contact regions 79 are formed on both sides of the bottom 81. The position and the width of each contact region 79 are determined based on the preceding contact angle α.

The contact region 79 is formed by using a low friction material that is for decreasing a friction resistance. Examples of the low friction material include a low friction material similar to that of the contact region 76 of the first convex portion 65.

With reference to FIG. 6, a lubricant holding section 82 is formed at a portion near the contact region 79, out of the inner race 391. The lubricant holding section 82 is for holding lubricant such as grease, and is formed on the first end surface 71 of the inner race 391, for example.

The lubricant holding section 82 has a configuration similar to that of the lubricant holding section 78 of the power transmission surface 70 of the input member main body 201. The lubricant holding section 82 is formed in at least one portion of a flat portion where the first concave portion 66 is not formed, out of the first end surface 71. Moreover, the lubricant holding section 82 may be formed in a portion where the contact region 79 is not formed, out of the first concave portion 66.

Meanwhile, at least one of the lubricant holding section 78 near the first convex portion 65 and the lubricant holding section 82 near the first concave portion 66 may be abolished. Further, at least one of the contact region 76 of the first convex portion 65 and the contact region 79 of the first concave portion 66 may be formed without using the low friction material.

Figure 8:
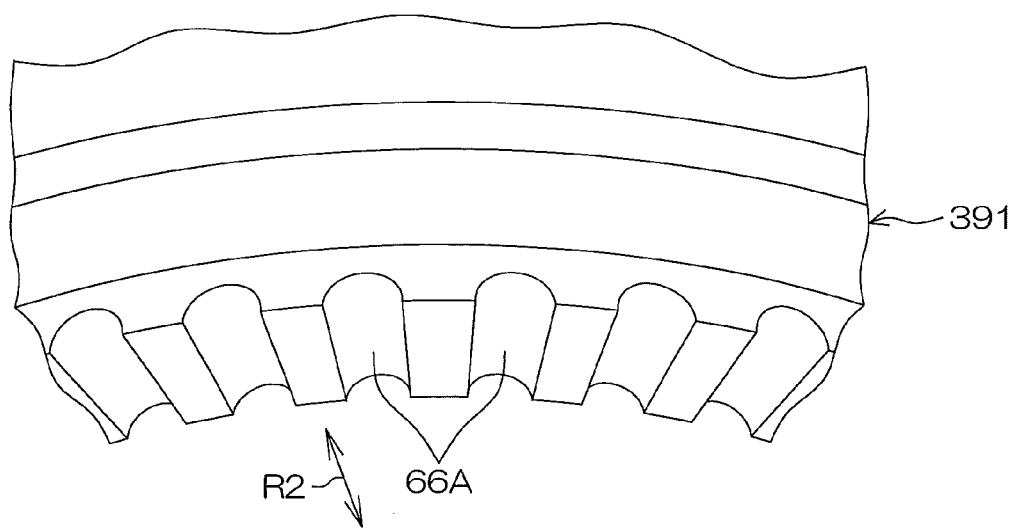
FIG. 8 is a perspective view showing relevant parts of another embodiment of the present invention.

Further, as shown in FIG. 8, the first convex portion 65A may be formed so as to have the same cross sectional shape at any position in the radial direction R1 of the input member 20. Accordingly, the first concave portion 66A is formed so as to have the same cross sectional shape at any position in the radial direction R2 of the inner race 391.

Figure 9:
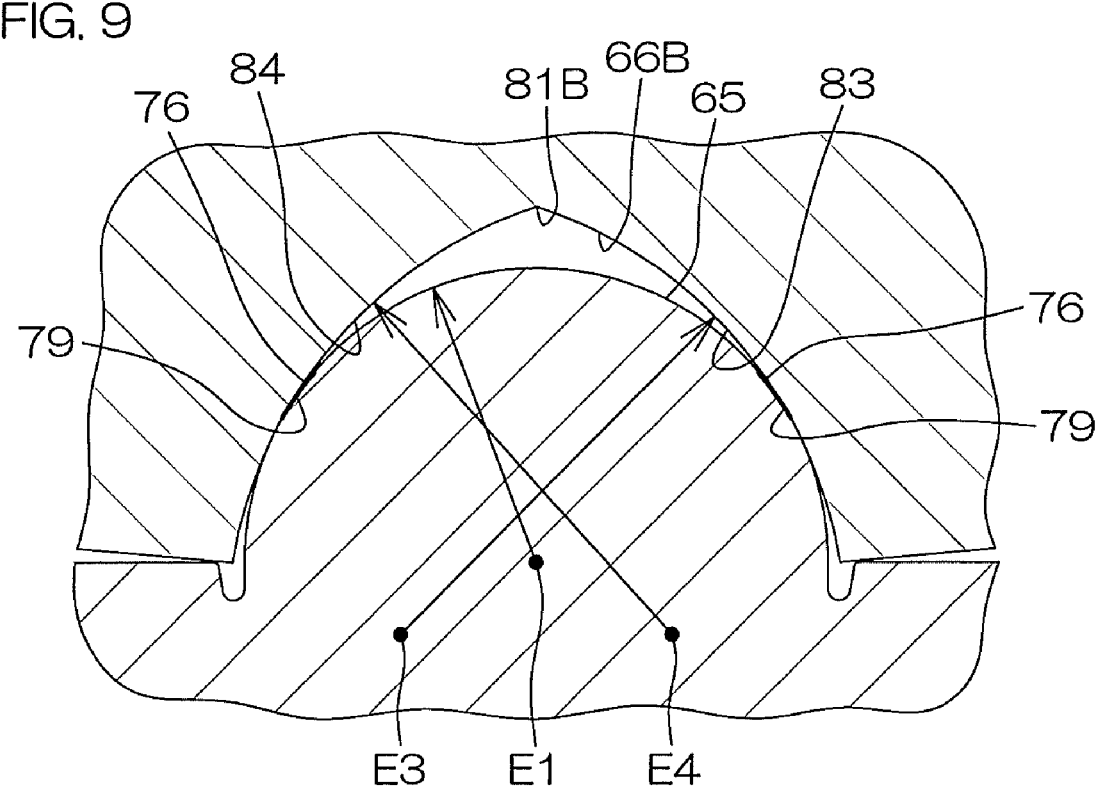
FIG. 9 is a cross-sectional view showing relevant parts of still another embodiment of the present invention.

Also, as shown in FIG. 9, the cross section of the first concave portion 66B may be formed in a gothic arch shape. In this case, the respective center lines E3 and E4 of a first arcuate surface 83 and a second arcuate surface 84 beside the bottom 81B of the first concave portion 66B, are placed to be offset from each other. With the aforementioned configuration, the contact region 76 of the first convex portion 65 and the contact region 79 of the first concave portion 66B can be made to make more reliable contact.

With reference to FIG. 4, the power transmission surface 70 of the input member main body 201 and the first end surface 71 of the inner race 391 may be respectively formed with bevel gears thereby to configure the first concave-convex engaging section. Also, the second end surface 73 of the inner race 391 and the power transmission surface 72 of the output member 22 may be respectively formed with bevel gears thereby to configure a second concave-convex engaging section. In this case, the first convex portion and the second convex portion are configured by teeth of the bevel gears, respectively. The first concave portion and the second concave portion are configured by grooves between the teeth of the bevel gears, respectively.

With reference to FIG. 4 and FIG. 6, the second convex portion 68 of the second concave-convex engaging section 67 has a configuration similar to that of the first convex portion 65 of the first concave-convex engaging section 64. The second concave portion 69 has a configuration similar to that of the first concave portion 66. More specifically, the power transmission surface 72 of the output member 22 has a configuration similar to that of the power transmission surface 70 of the input member main body 201. The second end surface 73 of the inner race 391 has a configuration similar to that of the first end surface 71 of the inner race 391. Therefore, a detailed description of the second concave-convex engaging section 67 will be omitted.

With reference to FIG. 3 again, the rotor 231 of the transmission ratio variable mechanism-use motor 23 includes a tubular shaped rotor core 85 extending in the axial direction S and a permanent magnet 86 fixed on the outer circumferential surface of the rotor core 85. Inward in the radial direction of the rotor core 85, the transmission ratio variable mechanism 5 and the torque sensor 44 are accommodated. By the rotor core 85, both the first concave-convex engaging section 64 and the second concave-convex engaging section 67 of the transmission ratio variable mechanism 5 are surrounded over the entire circumference. The torque sensor 44 is also surrounded over the entire circumference. As the transmission ratio variable mechanism 5 or the torque sensor 44 is accommodated within the rotor core 85, the length of the housing 24 with respect to the axial direction S can be shortened. As a result, an impact absorbing stroke for absorbing the impact by a secondary vehicle collision can be secured long. Moreover, a placement space for a tilt telescopic mechanism (not shown) arranged adjacent to the housing 24 can also be secured.

Examples of a material quality of the rotor core 85 include a steel, an aluminum alloy, a clad material, and a resin material. When the clad material which is a composite material formed by bonding together a plurality of types of metals is used, the oscillation can be inhibited. The use of the resin material in at least one portion of the rotor core 85 results in light weight, which allows rotor inertia to decrease.

At one end of the rotor core 85, a held hole 87 is formed. Inward in the radial direction of the held hole 87, an annular bearing holding section 88 is arranged. The bearing holding section 88 is placed in the annular convex portion 89 formed on the inner circumferential side of one end of the first housing 51. The second bearing 32 is interposed between the held hole 87 and the bearing holding section 88, thereby the one end of the rotor core 85 is rotatably supported by the first housing 51.

At an intermediate portion of the rotor core 85, a held hole 90 is formed. Inward in a radial direction of the held hole 90, an annular bearing holding section 91 is arranged. The bearing holding section 91 is placed in an annular extending section 92 formed on the inner circumferential side of one end of the second housing 52. The annular extending section 92 is formed in a tubular shape extending from a partition wall 93 arranged at the other end of the second housing 52 to one S1 side of the axial direction S, and inserts through the rotor core 85.

The fourth bearing 34 is interposed between the held hole 90 and the bearing holding section 91, thereby the intermediate portion of the rotor core 85 is rotatably supported by the annular extending section 92 of the second housing 52. By the second and fourth bearings 32 and 34 as a pair of bearings placed in a manner to sandwich the bearing ring unit 39 in the axial direction of the rotor 231, the rotor core 85 is both-end supported.

The permanent magnet 86 of the rotor 231 has polarities alternately different to each other in a circumferential direction C3 of the steering shaft 3. N-poles and S-poles are alternately placed at regular intervals with respect to the circumferential direction C3. The permanent magnet 86 is fixed on the outer circumferential surface of the intermediate portion of the rotor core 85. The permanent magnet 86 and one portion of the transmission ratio variable mechanism 5 are overlapped in position with each other with respect to the axial direction S.

The stator 232 of the transmission ratio variable mechanism-use motor 23 is accommodated within an annular first groove-shaped section 94 formed at the other end of the first housing 51. The first groove-shaped section 94 is opened toward the other S2 side of the axial direction S.

The stator 232 includes a stator core 95 formed by stacking a plurality of layers of electromagnetic steel plates and an electromagnetic coil 96.

The stator core 232 includes a toroidal-shaped yoke 97 and a plurality of teeth 98 that are placed at regular intervals in the circumferential direction of the yoke 97 and that are projecting inward in the radial direction of the yoke 97. The outer circumferential surface of the yoke 97 is fixed to the inner circumferential surface of the first groove-shaped section 94 of the second housing 52 by shrink fitting or any other similar technique. The electromagnetic coil 96 is wound around each of the teeth 98.

On the other S2 side of the axial direction S relative to the stator 232, the bus bar 99 is placed. The bus bar 99 is accommodated in the second housing 52 in a state of taking an entirely annular shape, and is connected to each electromagnetic coil 96 of the transmission ratio variable mechanism-use motor 23. The bus bar 99 supplies electric power from the driving circuit to each electromagnetic coil 96. The bus bar 99 and one portion of the third and fourth bearings 33 and 34 are overlapped in position with respect to the axial direction S.

On the other S2 side of the axial direction S relative to the bus bar 99, a lock mechanism 58 is placed. The lock mechanism 58 is for regulating the rotation of the rotor 231 of the transmission ratio variable mechanism-use motor 23, and is accommodated at one end of the second housing 52.

The lock mechanism 58 includes a regulated section 100 corotatably coupled to the rotor core 85, and a regulating section 101 for regulating the rotation of the regulated section 100 by being engaged with the regulated section 100. The regulated section 100 is an annular member. Concave portions 102 is formed on the outer circumferential surface of the regulated section 100. Each concave portion 102 is formed at one or a plurality of locations with respect to the circumferential direction of the regulated section 100. The concave portion 102 may be arranged in the rotor core 85. In this case, the rotor core 85 configures the regulated section 100. One portion of the regulated section 100 is overlapped with one portion of the torque sensor 44 with respect to a position in the axial direction S.

The regulating section 101 is placed opposite to each regulated section 100 in the radial direction of the regulated section 100. The regulating section 101 is held by the second housing 52, and is movable to a side of the regulated section 100. When the regulating section 101 moves to the side of the regulated section 100 so as to be engaged with the concave portion 102, the rotation of the rotor core 85 is regulated.

The motor resolver 43 is placed on the other S2 side of the axial direction S relative to the lock mechanism 58. The motor resolver 43 is accommodated in a second groove-shaped section 103 formed at one end of the second housing 52, and is positioned outward in the radial direction of the rotor core 85.

The second groove-shaped section 103 is an annular groove defined by an annular extending section 92 and an annular outer circumferential section 104 at one end of the second housing 52, and communicatively connects with the first groove-shaped section 94. An accommodating space 139 for accommodating the transmission ratio variable mechanism-use motor 23, the lock mechanism 58, and the motor resolver 43 is defined by the first and second groove-shaped sections 94 and 103.

The motor resolver 43 and the torque sensor 44 are opposite to each other in the radial direction R3 of the steering shaft 3. One portion of the motor resolver 43 and one portion of the torque sensor 44 are overlapped in position with each other with respect to the axial direction S. The motor resolver 43 includes a resolver rotor 105 and a resolver stator 106. The resolver rotor 105 is fixed corotatably on the outer circumferential surface 107 at the other end of the rotor core 85. The resolver stator 106 is fixed by a press fit on the inner circumferential surface 108 of the outer circumferential section 104 of the second housing 52.

The first bearing 31 rotatably supports the input member 20. The first shaft 11 is rotatably supported by the first housing 51 via the tubular member 202 and the first bearing 31 of the input member 20. The first bearing 31 is surrounded by the second bearing 32, and the both components are overlapped in position with respect to the axial direction S.

The third bearing 33 is interposed between a bearing holding hole 110 formed in the inner circumferential section at the leading end of the extending section 92 of the second housing 52 and a bearing holding section 111 formed in the output member 22. The output member 22 is rotatably supported by the annular extending section 92 of the second housing 52 via the third bearing 33. The third bearing 33 is surrounded by the fourth bearing 34, and the both components are overlapped in position with respect to the axial direction S.

A preload is respectively imparted to the first concave-convex engaging section 64 and the second concave-convex engaging section 67. Thereby, smooth engagement between the first convex portion 65 and the first concave portion 66 and smooth engagement between the second convex portion 68 and the second concave portion 69 are respectively enabled.

A screw member 113 is placed in the inner circumferential section 112 at one end of the first housing 51. The screw member 113 configures a biasing member for biasing the input member main body 201 in a bias direction H (the other S2 side of the axial direction S) in which the input member main body 201 is brought close to the output member 22. Moreover, the screw member 113 configures a rigid member for rigidly supporting the outer race 312 of the first bearing 31 with respect to the axial direction S. The screw member 113 biases the input member main body 201 toward the output member 22, thereby to impart a preload to the first concave-convex engaging section 64 and the second concave-convex engaging section 67, respectively.

A male screw section 113a formed on the outer circumferential surface of the screw member 113 is threaded onto a female screw section 134a of the bearing holding hole 134 formed in the inner circumference of an annular convex portion 89 at one end of the first housing 51. Thereby, the screw member 113 biases (presses against) one end surface of the outer race 312 of the first bearing 31 held in the bearing holding hole 134 of the first housing 51, in the bias direction H. The outer race 312 of the first bearing 31 is rotatable to the bearing holding hole 134 and is relatively movable to the axial direction S. A lock nut 135 is arranged adjacent to the screw member 113. The lock nut 135 regulates the rotation of the screw member 113 in a state of being threaded onto the female screw section 134a.

The inner race 311 of the first bearing 31 is corotatably coupled to one end of the tubular member 202 by being pressed fit thereinto or other similar techniques, and is corotatable to the input member main body 201 and can be moved together therewith in the axial direction S via the tubular member 202. The inner race 311 comes into contact with one end section of the input member main body 201 so as to press against the input member main body 201 in the bias direction H.

Moreover, the first convex portion 65 of the first concave-convex engaging section 64 opposes the first concave portion 66 in the bias direction H. Likewise, the second concave portion 69 of the second concave-convex engaging section 67 opposes the second convex portion 68 in the bias direction H. The inner race 331 of the third bearing 33 is fixed to the output member 22 by a press fit. In the output member 22, a step section of its center portion contacts one end surface of the inner race 331 so as to press against the inner race 331 in the bias direction H. The outer race 332 of the third bearing 33 is set at an annular step section 114 placed adjacent to the bearing holding hole 110 for movably holding the outer race 332 into the bias direction H, whereby the movement in the bias direction H is regulated. The movement of the output member 22 in the bias direction H is regulated by the third bearing 33.

By the above-described configuration, the biasing force of the screw member 113 is transmitted to the inner race 311 via the outer race 312 and the rolling element of the first bearing 31, and further transmitted to the input member main body 201. The biasing force transmitted to the input member main body 201 is transmitted to the first concave-convex engaging section 64 and the second concave-convex engaging section 67 in this order, and further transmitted to the inner race 331, the rolling element, and the outer race 332 of the third bearing 33. The biasing force transmitted to the outer race 332 of the third bearing 33 is received by the annular step section 114.

Along with the movement of the inner race 391 of the bearing ring unit 39 in the bias direction H by the biasing force of the of screw member 113, the rolling element 393 of the bearing ring unit 39, the outer race, and the rotor 231 of the transmission ratio variable mechanism-use motor 23 are moved all together in the bias direction H.

Specifically, the outer race of the bearing ring unit 39 is fixed by a press fit to the inclined hole 63 of the rotor core 85. Thereby, the rotor core 85 holds the outer race in a manner to rotate together about the first axis A and to move together in the axial direction S.

Moreover, the respective outer races 322 and 342 of the second bearing 32 and the fourth bearing 34 are loosely fitted to the corresponding annular held holes 87 and 90 of the rotor core 85, whereby the rotor core 85 is supported relatively movably in the axial direction S. The inner race 321 of the second bearing 32 is fixed by a press fit to the bearing holding section 88 of the annular convex portion 89. The inner race 341 of the fourth bearing 34 is fixed by a press fit to the bearing holding section 91 of the annular extending section 92 of the second housing 52.

Moreover, by using the screw member 113, the output member 22 may be biased in a bias direction (direction opposite to the bias direction H) in which the output member 22 is brought close to the input member main body 201. In this case, the screw member 113 is screwed into the bearing holding hole 110 for holding the third bearing 33. The biasing force of the screw member 113 is transmitted in the order of: the third bearing 33, the output member 22, the second concave-convex engaging section 67, the first concave-convex engaging section 64, the input member main body 201, the inner race 311 of the first bearing 31, the rolling element, and the outer race 312, and is received by the first housing 51.

The movement of the inner race 391 in the bias direction H will not be obstructed by the support mechanism 133. Specifically, the outer race 382 of the eighth bearing 38 of the support mechanism 133 is loosely fitted to the bearing holding hole 109 of the tubular member 202, and is relatively movable to the bearing holding hole 109 in the axial direction S. The inner race 381 of the eighth bearing 38 is fixed by a press fit to the opposite end section 12a of the second shaft 12. Moreover, the outer race 382 of the eighth bearing 38 may be fixed by a press fit to the bearing holding hole 109, loosely fitting the inner race 381 to the opposite end section 12a.

The torque sensor 44 is placed inward in the radial direction of the rotor core 85 of the transmission ratio variable mechanism-use motor 23, and includes a multipole magnet 115 and magnetic yokes 116 and 117. The multipole magnet 115 is fixed to the intermediate portion of the second shaft. The magnetic yokes 116 and 117 are supported at one end of the third shaft 13, as a pair of soft magnetic materials that form a magnetic circuit by being placed within a magnetic field generated by the multipole magnet 115.

The multipole magnet 115 is a cylinder-shaped permanent magnet, and is magnetized with a plurality of poles (equal in number between N-poles and S-poles) at regular intervals in the circumferential direction.

The magnetic yokes 116 and 117 are opposed to the multipole magnet 115 with predetermined gaps in the radial direction of the multipole magnet 115, and surround the multipole magnet 115. Each of the magnetic yokes 116 and 117 is molded into a synthetic resin member 118. The synthetic resin member 118 is coupled corotatably to one end of the third shaft 13.

The torque sensor 44 further includes a pair of magnetism collecting rings 119 and 120 for inducing a magnetic flux from the magnetic yokes 116 and 117. The pair of magnetism collecting rings 119 and 120 are each an annular member formed by using a soft magnetic material, and surround the magnetic yokes 116 and 117 so as to be magnetically linked to each of the magnetic yokes 116 and 117.

The pair of magnetism collecting rings 119 and 120 are opposed to each other to be spaced in the axial direction S. The magnetism collecting rings 119 and 120 are molded by the synthetic resin member 121. The synthetic resin member 121 is held by the annular extending section 92 of the second housing 52.

The magnetic flux is generated in the magnetic yokes 116 and 117 according to a relative rotation amount of the second and third shafts 12 and 13. The magnetic flux is induced by the magnetism collecting rings 119 and 120, and is detected by a hole IC (not shown) buried in the synthetic resin member 121. Thereby, it becomes possible to detect a magnetic flux density according to a torque applied to the second shaft 12 (steering member).

With reference to FIG. 2, the fifth bearing 35 is placed on the other S2 side of the axial direction S relative to the torque sensor 44. The fifth bearing 35 is interposed between a bearing holding section 122 formed in the outer circumference at one end of the third shaft 13 and a bearing holding hole 123 formed on the partition wall 93 of the second housing 52. The bearing holding hole 123 rotatably supports one end of the third shaft 13 via the fifth bearing 35.

The third shaft 13 surrounds the second shaft 12 and the torsion bar 14. Specifically, the third shaft 13 has a through hole 124 opened to one end of the third shaft 13. The other end of the second shaft 12 is inserted in the through hole 124. The second shaft 12 has a through hole 125 extending in the axial direction S. The torsion bar 14 is inserted in the through hole 125.

One end of the torsion bar 14 is corotatably coupled to one end of the through hole 125 of the second shaft 12 by serration fitting or any other similar technique. The other end of the torsion bar 14 is corotatably coupled to the through hole 124 of the third shaft 13 by serration fitting or any other similar technique.

A space inward in the radial direction of the annular extending section 92 of the second housing 52 is used as a torque sensor accommodating chamber 126, and a structure for inhibiting intrusion of lubricant into the torque sensor accommodating chamber 126 is further arranged.

One end of the torque sensor accommodating chamber 126 is closed by the seal-provided third bearing 33 placed at one end of the annular extending section 92 of the second housing 52, the output member 22 placed inward in the radial direction of the third bearing 33, and the second shaft 12 placed inward in the radial direction of the output member 22. The other end of the torque sensor accommodating chamber 126 is closed by the seal-provided fifth bearing 35, the third shaft 13 placed inward in the radial direction of the fifth bearing 35, and the torsion bar 14 for clogging the through hole 124 of the third shaft 13.

With the above-described configuration, it is possible to inhibit the lubricant filled in the respective first and second concave-convex engaging sections 64 and 67 from intruding into the torque sensor accommodating chamber 126. Also, it is possible to inhibit the lubricant filled in the engaging region of the worm shaft 27 and the worm wheel 28 of the reduction gear mechanism 26 from intruding into the torque sensor accommodating chamber 126.

The second shaft 12 and the third shaft 13 are supported relatively rotatably to each other via the sixth bearing 36. The sixth bearing 36 is surrounded by the worm wheel 28 of the reduction gear mechanism 26. The reduction gear mechanism 26 is accommodated in the accommodating chamber 128 defined by the outer circumference section 127 and the end wall section 61 of the third housing 53, and the partition wall 93 of the second housing 52. One portion of the worm wheel 28 and the sixth bearing 36 are overlapped in position with respect to the axial direction S.

The seventh bearing 37 is interposed between the intermediate portion of the third shaft 13 and the end wall section 61 of the third housing 53. The end wall section 61 rotatably supports the third shaft 13 via the seventh bearing 37.

The inner race 371 of the seventh bearing 37 is held by an annular step section 129 formed at the outer circumference section 127 of the third shaft 13 and a nut member 130 threaded onto the outer circumference section 127 of the third shaft 13. The outer race 372 of the seventh bearing 37 is held by an annular step section 131 formed in the third housing 53 and a locating snap 132 held in the third housing 53.

Subsequently, one example of the operation of the motor vehicle steering system 1 will be described. In the following description, three cases are described, that is, a case (i) that the rotation of the rotor 231 of the transmission ratio variable mechanism-use motor 23 is regulated; a case (ii) that the rotor 231 of the transmission ratio variable mechanism-use motor 23 is rotated and the input member 20 is not rotated; and a case (iii) that the rotor 231 of the transmission ratio variable mechanism-use motor 23 is rotated and the input member 20 is rotated.

Any of the cases of (i), (ii), and (iii) is described as follows: the number of first convex portions 65 of the first concave-convex engaging section 64 is 38 and the number of the first concave portions 66 thereof is 40, and the number of the second convex portions 68 of the second concave-convex engaging section 67 is 40 and the number of second concave portions 69 thereof is 40.

In the case of (i), that is, in a case that the rotation of the rotor 231 of the transmission ratio variable mechanism-use motor 23 is regulated by the lock mechanism 58, the first convex portion 65 of the input member main body 201 is rotated about the first axis A when the first shaft 11 is rotated by the operation of the steering member. In this case, the bearing ring unit 39 does not perform coriolis motion, that is, rotation about the first axis A, but the inner race 391 only rotates about the second axis B. This rotation rotates the inner race 391 arranged with the first concave portion 66, and further rotates the second shaft 12.

As a result, when the input member 20 makes one rotation, the inner race 391 makes 38/40 rotation, and the output member 22 makes 38/40 rotation. That is, the rotation of the input member 20 is decelerated to 19/20.

In the case of (ii), that is, in a case that the rotor 231 of the transmission ratio variable mechanism-use motor 23 is rotated and the input member 20 is not rotated due to a driver's holding the steering member, the rotor 231 is rotated about the first axis A, whereby the bearing ring unit 39 performs coriolis motion. Thereby, the inner race 391 attempts to cause the input member 20 and the output member 22 to reversely rotate each other. However, because the rotation of the input member 20 is regulated, the output member 22 only is rotated.

In this case, as a result of the number of first concave portions 66 being larger by two than the number of first convex portions 65, the inner race 391 is caused to advance its phase by an amount equivalent to a difference in the number of teeth (two) while the outer race of the bearing ring unit 39 makes one rotation. This results in the rotation of the inner race 391. As a result, when the outer race makes one rotation, the inner race 391 is rotated by an amount equivalent to the difference in the number of teeth and the output member 22 makes 2/40 rotations. As described above, the rotation of the rotor 231 of the transmission ratio variable mechanism-use motor 23 is decelerated to 1/20, and the resultant rotations are output.

In the case of (iii), that is, in a case that the rotor 231 of the transmission ratio variable mechanism-use motor 23 is rotated and the input member 20 is rotated due to the driver steering the steering member, a rotation amount of the output member 22 makes a value obtained by adding the rotation amount of the input member 20 (steering member) to the rotation amount of (ii).

Thereby, when the vehicle travels at a relatively low speed, the steering angle θ1 may be amplified so as to exhibit a function of assisting the steering of the driver.

Moreover, when the vehicle travels at a relatively high speed, the steering angle θ1 and the vehicle yaw rate γ may be compared, for example, to determine a vehicle behavior. As a result, when the vehicle behavior determined from the steering angle θ1 and the vehicle behavior determined from the detected yaw rate γ are not matched, the rotation of the rotor 231 of the transmission ratio variable mechanism-use motor 23 may be increased or decreased in speed, whereby a vehicle stability control (attitude stability control) is performed. Moreover, it may be also possible to control driving of the rotor 231 of the transmission ratio variable mechanism-use motor 23 so that a counter steering operation is performed.

As described above, according to the embodiment, the first convex portion 65 of the first concave-convex engaging section 64 is integrally formed in the input member main body 201, the first and second concave portions 66 and 69 are integrally formed in the inner race 391, and the second convex portions 68 of the second concave-convex engaging section 67 is integrally formed in the output member 22.

This reduces the number of components of the transmission ratio variable mechanism 5. Moreover, it is not necessary to separately prepare the holding members for respectively holding the first and second convex portions 65 and 68, and thus, the number of components of the transmission ratio variable mechanism 5 can be further reduced. Further, as the number of components is small, the assembly of the transmission ratio variable mechanism 5 can be facilitated.

With the aforementioned configuration that the respective convex portions 65 and 68 and concave portions 66 and 69 are integrally formed in the corresponding members 201, 391, and 22, the accuracy for assembling the mutual components can be more easily enhanced as compared to a case that the respective convex portions 65 and 68 and concave portions 66 and 69 are formed separately of the corresponding members 201, 391, and 22.

Further, because of the configuration that the respective convex portions 65 and 68 and concave portions 66 and 69 of the first and second concave-convex engaging sections 64 and 67, and the corresponding members 201, 391, and 22 are formed integrally by using a single material, and thus, the respective convex portions 65 and 68 (respective concave portions 66 and 69) and the corresponding members 201, 391, and 22 can be collectively formed, the number of manufacturing process can be reduced.

Moreover, the relieving section 75 is arranged at the base end section 74 of the respective convex portions 65 and 68, and thus, when the respective convex portions 65 and 68 are engaged with the corresponding concave portions 66 and 69, the respective first and second convex portions 65 and 68 are prevented from generation of undercut therein, whereby wearing of the respective convex portions 65 and 68 and concave portions 66 and 69 can be decreased.

Further, out of the respective convex portions 65 and 68 and concave portions 66 and 69, the more outward in the radial direction of the corresponding members 201, 391, and 22, the wider the widths F1 and F2 in the circumferential direction of the corresponding members 201, 391, and 22. As a result, the sliding of the both concave portions 66 and 69 and corresponding convex portions 65 and 68 in mutual engagement can be reduced. Thereby, the durability of the respective convex portions 65 and 68 and concave portions 66 and 69 can be made longer.

Moreover, corresponding lubricant holding sections 78 and 82 are arranged near the contact regions 76 and 79 of the respective convex portions 65 and 68 and concave portions 66 and 69. This enables supplying of the lubricant to the contact regions 76 and 79 from near the respective contact regions 76 and 79, thereby making the engagement between the respective convex portions 65 and 68 and the corresponding concave portions 66 and 69 more smooth.

Further, the contact regions 76 and 79 of the respective convex portions 65 and 68 and concave portions 66 and 69 are formed by using a low friction material for decreasing a friction resistance. This further decreases the friction resistance caused when the respective concave portions 66 and 69 are engaged with the corresponding convex portions 65 and 68.

The arrangement of the steering-assist-force imparting mechanism 19 enables imparting of the steering assist force to the turning mechanism 10, thereby reducing a force required by the driver for steering.

Among the inner race 391 and the outer race, the first and second concave-convex engaging sections 64 and 67 are arranged on the side of the inner race 391 that is relatively small in diameter. Thus, a support span in the radial direction can be shortened when the inner race 391 is supported from the both sides in the axial direction by the input member 20 and the output member 22. This increases the supporting rigidity of the inner race 391.

Further, among the inner race 391 and the outer race, the concave portions 66 and 69 of the first and second concave-convex engaging sections 64 and 67 are arranged on the side of the inner race 391 that is relatively small in diameter. Thereby, the circumferential speed of the concave portions 66 and 69 arranged in the inner race 391 can be decreased on driving. Thus, an engaging noise of the respective first and second concave-convex engaging sections 64 and 67 can be decreased.

Moreover, the outer race of the bearing ring unit 39 is surrounded by the rotor 231. Thus, it is possible to inhibit an engaging noise of the respective first and second concave-convex engaging sections 64 and 67 from being transmitted to the outside of the rotor 231, thereby further decreasing the noise.

The second axis B as a center line of the outer race can be inclined to the first axis A by making the inclined hole 63 of the rotor core 85 of the rotor 23 hold the outer race.

Further, the rotor core 85 can be both-end supported by the second and fourth bearings 32 and 34. Thus, the supporting rigidity of the rotor 231 can be increased. Also, the placement of the inner race 391 between the second and fourth bearings 32 and 34 enables firmly supporting the rotor core 85 for receiving the force from the inner race 391, thereby the rotor 231 is prevented from runout. As a result, it is possible to contribute to a decrease in noise.

Further, by the eighth bearing 38, the mutual opposite end sections 11a and 12a of the first and second shafts 11 and 12 are mutually supported, and thus, the mutual coaxiality of the first and second shafts 11 and 12 can be improved. As a result, the input member 20 and the output member 22 are prevented from swinging of the shaft with respect to others. A state of engagement between the convex portions 65 and 68 and the corresponding concave portions 66 and 69 in the respective concave-convex engaging sections 64 and 67 is inhibited from being inadvertently changed, thereby contributing to decrease in an engaging noise.

The support mechanism 133 can be realized, moreover, by a simple configuration using the tubular member 202 and the eighth bearing 38. Further, the arrangement of the eighth bearing 38 between the first shaft 11 and the second shaft 12 enables a smooth relative rotation of the first and second shafts 11 and 12.

Further, the operation of the steering member 2 by a driver can be corrected by the transmission ratio variable mechanism 5. Thus, a so-called active steering in which a counter steering operation is automatically performed by the transmission ratio variable mechanism 5 is enabled, for example.

In each of the first concave-convex engaging section 64 arranged on the side of the first end surface 71 of the inner race 391 and the second concave-convex engaging section 67 arranged on the side of the second end surface 73 of the inner race 391, preloads are imparted between the respective convex portions 65 and 68 and corresponding concave portions 66 and 69. Thereby, in each of the first and second concave-convex engaging sections 64 and 67, the respective convex portions 65 and 68 and corresponding concave portions 66 and 69 can be prevented from generation of backlash between them, thereby decreasing the engaging noise.

The inner race 391 is smaller in diameter than the outer race. Thus, the support span can be shortened in the radial direction where the inner race 391 is supported from the both sides in the axial direction by the input member 20 and the output member 22. Thereby a deformation of the inner race 391 can be decreased that results from the biasing force from the screw member 113. Thereby, a sufficient biasing force can be acted on the respective concave portions 66 and 69 formed in the inner race 391. Thus, the respective first and second concave-convex engaging sections 64 and 67 can be reliably prevented from occurrence of backlash therein.

Also, the screw member 113 biases the input member 20 toward the output member 22. Thereby, the biasing force of the screw member 113 can be transmitted in the order of: the input member 20; the first concave-convex engaging section 64 arranged on the side of the first end surface 71 of the inner race 391; the second concave-convex engaging section 67 arranged on the side of the second end surface 73 of the inner race 391; and the output member 22.

Further, the preload can be imparted by the screw member 113 to the first bearing 31. Thus, an abnormal noise resulting from the first bearing 31 can be prevented from being generated.

The biasing force by the screw member 113 can be adjusted by adjusting the screwing amount of the screw member 113 into the female screw section 134a.

Further, the biasing force of the screw member 113 can be transmitted to the inner race 311 of the first bearing 31 via the outer race 312 of the first bearing 31. Thereby, the preload can be reliably imparted to the first bearing 31.

The force generated when the output member 22 unforcedly makes movement in the bias direction H can be received by the third bearing 33, and thus, the preload can be imparted to the third bearing 33.

The second and fourth bearings 32 and 34 support the rotor 231 movably in the axial direction S. Thereby, along with the movement of the inner race 391 by the biasing force of the screw member 113 in the axial direction of the rotor 231, the outer race and the rotor 231 can be moved together in the axial direction of the rotor 231. As a result, an unnecessary force can be prevented from being acted between the inner race 391 and the outer race.

Further, the output of the transmission ratio variable mechanism 5 is transmitted via the steering-assist-force imparting mechanism 19 to the turning mechanism 10. In this configuration, when the output of the steering-assist-force imparting mechanism 19 is transmitted to the turning mechanism 10, the output can be transmitted to the turning mechanism 10 without use of the transmission ratio variable mechanism 5. Thereby, the power input to the transmission ratio variable mechanism 5 can be decreased, and thus, the transmission ratio variable mechanism 5 can be made compact.

The input member 20, the inner race 391, and the output member 22 are aligned in a direction in which the first axis A extends (axial direction S). Thereby, the transmission ratio variable mechanism 5 can be made compact with respect to the radial direction of the input member 20 and the output member 22 (radial direction R3). As a result, the transmission ratio variable mechanism 5 can be made more compact.

Also, the rotor core 85 of the rotor 231 of the transmission ratio variable mechanism-use motor 23 is formed in a tubular shape surrounding the first and second concave-convex engaging sections 64 and 67. Thereby, the rotor 231 and the first and second concave-convex engaging sections 64 and 67 can be placed at a position overlapping with respect to the axial direction S. Thereby, further compactness of the motor vehicle steering system 1 can be achieved. The rotor 231 can be used as a soundproof wall. Thus, leaking of the engaging noise of the first and second concave-convex engaging sections 64 and 67 to the outside can be inhibited.

Further, as the torque sensor 44 is surrounded by the rotor core 85 of the rotor 231 of the transmission ratio variable mechanism-use motor 23, the rotor 231 and the torque sensor 44 can be placed at a position overlapping with respect to the axial direction S. As a result, further compactness of the motor vehicle steering system 1 can be achieved.

The transmission ratio variable mechanism 5 and the steering-assist-force imparting mechanism 19 are arranged as steering columns in the housing 24. As the housing 24 is assembled into the vehicle, the transmission ratio variable mechanism 5 and the steering-assist-force imparting mechanism 19 can be collectively assembled into the vehicle. Moreover, the present invention offers superior noise reduction. Thus, even if the transmission ratio variable mechanism 5 and the steering-assist-force imparting mechanism 19 are arranged in the vehicle compartment where the housing 24 is placed, there is little influence from the driving noise.

The present invention is not limited to the contents of the embodiment described above, and various modifications within a scope of the claims can be made.

For example, the steering-assist-force imparting mechanism 19 in FIG. 1 may be eliminated. In the following description, points different from those in the preceding embodiment are mainly described. Like reference numerals are assigned in a similar configuration to omit description.

In this case, the driving circuit 41, the steering assisting motor 25, the reduction gear mechanism 26, the third shaft 13, the torsion bar 14, and the torque sensor 44 shown in FIG. 1 are eliminated. Further, the other end of the second shaft 12 is coupled to the universal joint 9.

Figure 10:
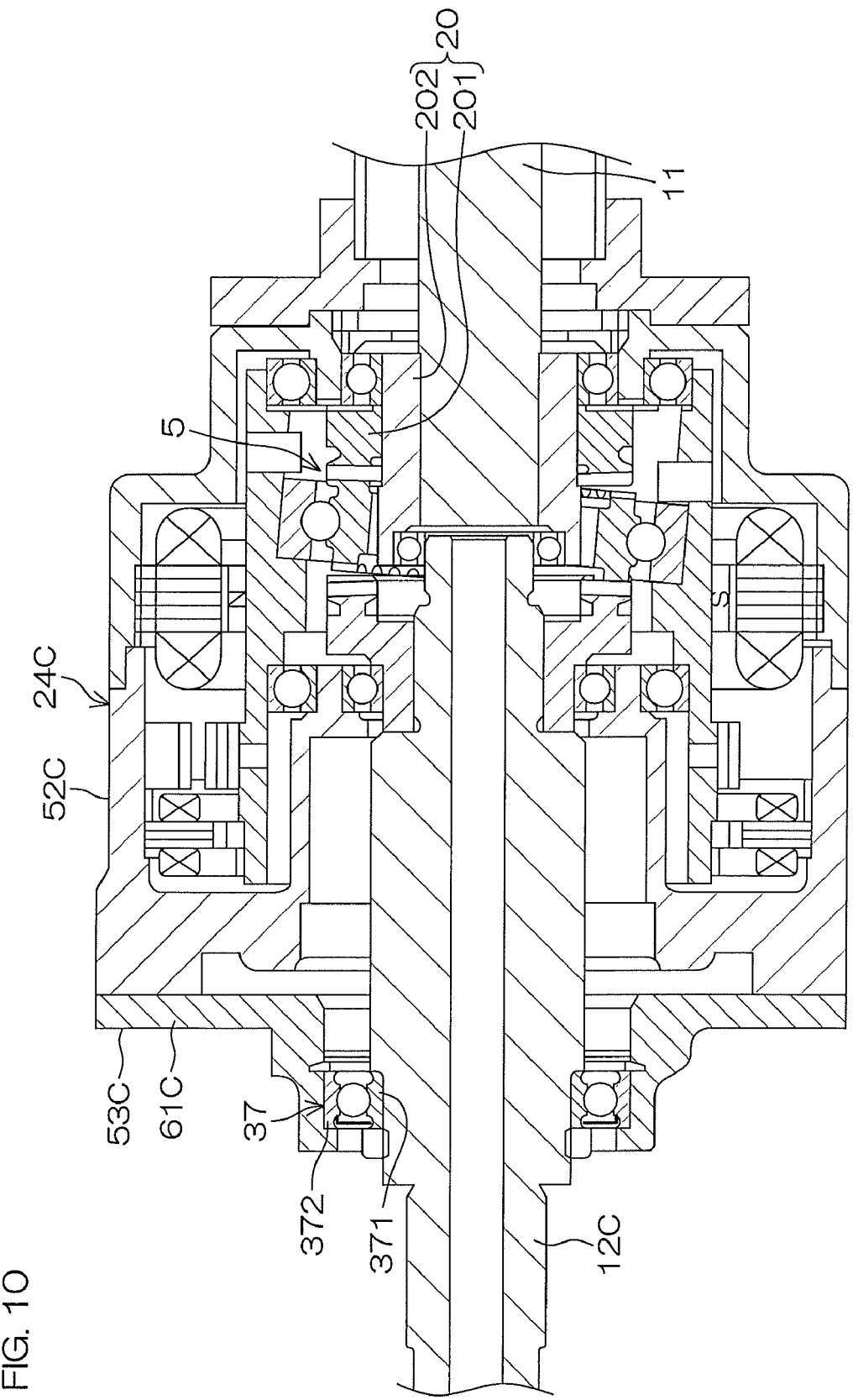
FIG. 10 is a cross-sectional view showing relevant parts of yet still another embodiment of the present invention.

In this case, as shown in FIG. 10, an end wall section 61C of a third housing 53C is fixed to a second housing 52C in a state of being caused to run along the other end of the second housing 52C. In the third housing 53C, no accommodating chamber for accommodating a reduction gear mechanism is arranged.

The second shaft 12C, which extends to the other end of the third housing 53C and protrudes to the outside of the housing 24C, is connected to a turning mechanism (not shown). An intermediate portion of the second shaft 12C is corotatably coupled with the inner race 371 of the seventh bearing 37.

Figure 11:
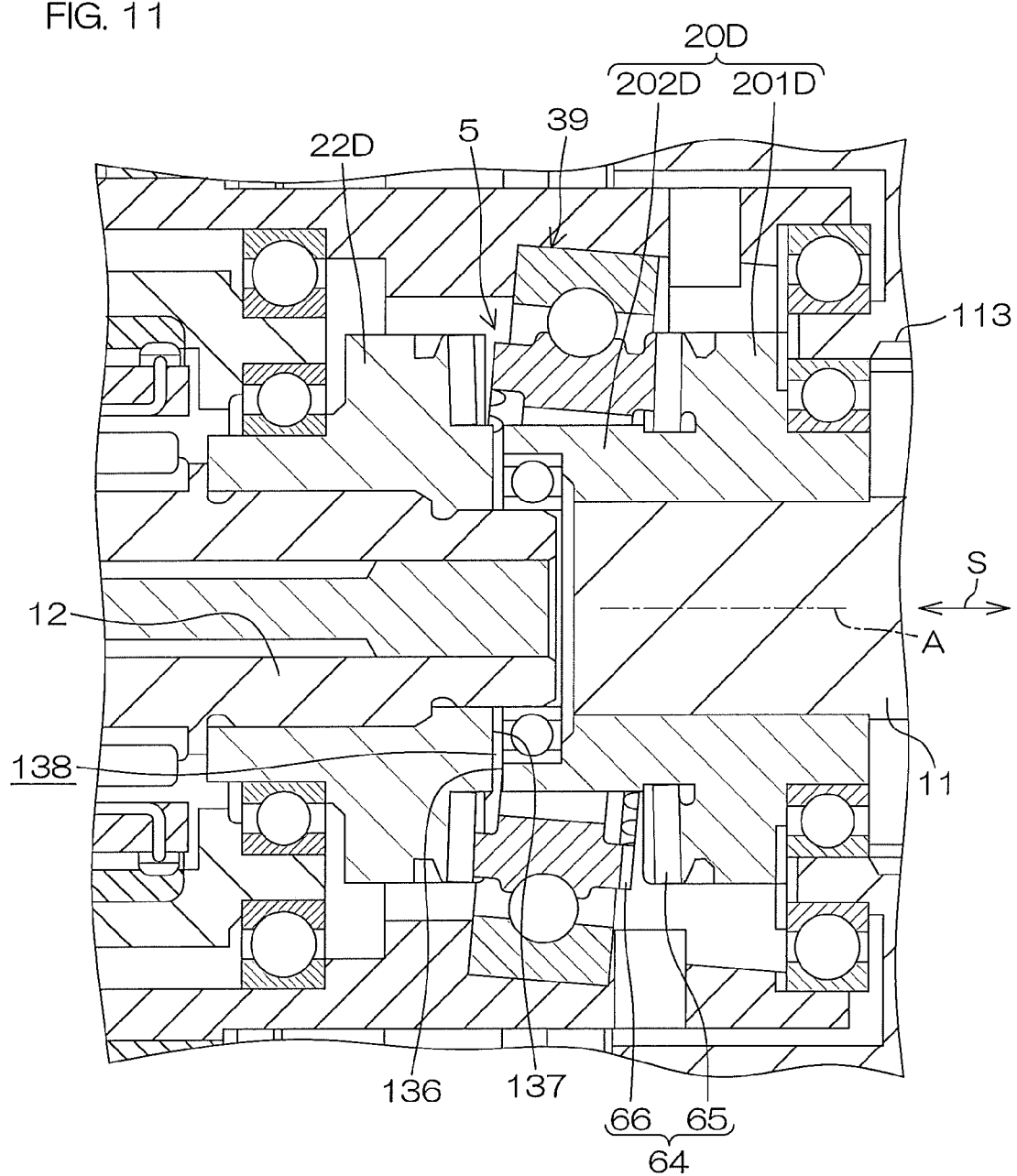
FIG. 11 is a cross-sectional view showing relevant parts of another embodiment of the present invention.

As shown in FIG. 11, instead of the input member 20, it may be possible to use an input member 20D formed so that an input member main body 201D and a tubular member 202D are integrally formed by using a single member. The first convex portion 65 of the first concave-convex engaging section 64 is integrally formed with the input member 20D as a corresponding member by using a single member.

A tubular member 202D and an output member 22D of the input member 20D include opposite surfaces 136 and 137 that are opposed to each other. The opposite surfaces 136 and 137 are opposed to each other while arranging a gap 138 in the axial direction S as a direction parallel to the first axis A.

Thereby, when the input member 20D and the output member 22D come close to each other by the biasing force of the screw member 113, the opposite surfaces 136 and 137 can be prevented from contact with each other.

The input member 20D and the first convex portion 65 are formed integrally by a single member. Thereby, the first convex portion 65 and the input member 20D can be collectively formed. As a result, the number of manufacturing process can be reduced.

Further, it may be possible to adopt a bearing ring unit 39 provided with an outer race for differentially rotatably coupling the input member 20 and the output member 22 and an inner race for rotatably supporting the outer race via a rolling element. Moreover, the present invention may be applicable to another general device other than the motor vehicle steering system.

What is claimed is:

1. A transmission ratio variable mechanism capable of changing a transmission ratio of a steered angle of steered wheels to a steering angle of a steering member, comprising:
   an input member and an output member capable of rotation about a first axis;
   a first bearing ring, having first and second end surfaces, for differentially rotatably coupling the input member and the output member to each other;
   a second bearing ring for rotatably supporting the first bearing ring via a rolling element; and
   an actuator capable of rotation-driving the second bearing ring, wherein a second axis being a center line of the first bearing ring and the second bearing ring is inclined to the first axis,
   wherein the input member and the output member respectively have power transmission surfaces respectively opposite the first and the second end surfaces of the first bearing ring,
   wherein a first concave-convex engaging section for power-transmittably engaging the first end surface of the first bearing ring and the power transmission surface of the input member corresponding to the first end surface is arranged,
   wherein the first concave-convex engaging section includes a first convex portion arranged on one of the first end surface and the power transmission surface corresponding to the first end surface, and a first concave portion that is arranged on an alternate surface and that is engaged with the first convex portion,
   wherein a second concave-convex engaging section for power-transmittably engaging the second end surface of the first bearing ring and the power transmission surface of the output member corresponding to the second end surface is arranged, and
   wherein the second concave-convex engaging section includes a second convex portion arranged on one of the second end surface and the power transmission surface corresponding to the second end surface, and a second concave portion that is arranged on an alternate surface and that is engaged with the second convex portion.

2. The transmission ratio variable mechanism according to claim 1, wherein
   the actuator comprises an electric motor, and the electric motor includes a rotor for corotatably holding the second bearing ring and capable of rotation about the first axis.

3. The transmission ratio variable mechanism according to claim 2, wherein
   the rotor is formed in a tubular shape surrounding the first concave-convex engaging section and the second concave-convex engaging section.

4. The transmission ratio variable mechanism according to claim 2, wherein
   the rotor is formed with an inclined hole, having a center line along the second axis, for holding the second bearing ring.

5. The transmission ratio variable mechanism according to claim 2, wherein
   the rotor is both-end supported by a second bearing and a fourth bearing held by a housing, and the first bearing ring is placed between the second bearing and the fourth bearing with respect to an axial direction of the rotor.

6. The transmission ratio variable mechanism according to claim 5, wherein
   the second bearing and the fourth bearing movably support the rotor with respect to the axial direction of the rotor.

7. The transmission ratio variable mechanism according to claim 1, further comprising:
   a first shaft inserted through a through hole formed in the input member and corotatably connected to the input member;
   a second shaft inserted through a through hole formed in the output member and corotatably connected to the output member; and
   a support mechanism for coaxially, relatively rotatably supporting mutual opposite end sections of the first shaft and the second shaft.

8. The transmission ratio variable mechanism according to claim 7, wherein the support mechanism includes:
   a tubular member that surrounds the mutual opposite end sections of the first shaft and the second shaft and that is corotatably coupled to one of the first shaft and the second shaft; and
   a bearing, interposed between an alternate one of the first shaft and the second shaft and the tubular member, for permitting relative rotation of the both components thereof.

9. The transmission ratio variable mechanism according to claim 1, further comprising a biasing member for biasing in a bias direction in which one of the input member and the output member is brought close to an alternate one of the input member and the output member, wherein
   a preload is imparted to the first concave-convex engaging section and the second concave-convex engaging section by the biasing member.

10. The transmission ratio variable mechanism according to claim 9, wherein
    the biasing member biases the input member toward the output member.

11. The transmission ratio variable mechanism according to claim 9, further comprising a first bearing, held by a housing, for rotatably supporting the input member, wherein
    the biasing member biases the input member via the first bearing.

12. The transmission ratio variable mechanism according to claim 11, wherein
    the first bearing is held by a bearing holding hole arranged in the housing, and
    the biasing member includes a screw member engaged with a screw section formed in the bearing holding hole.

13. The transmission ratio variable mechanism according to claim 12, wherein
    the first bearing includes an outer race held rotatably by the bearing holding hole and movably in an axial direction along the first axis and an inner race that can be rotated and moved together in the axial direction with the input member, and
    the screw member presses against an end surface of the outer race.

14. The transmission ratio variable mechanism according to claim 11, further comprising a third bearing, held by the housing, for rotatably supporting the output member, wherein
    movement of the output member in a bias direction is regulated by the third bearing.

15. The transmission ratio variable mechanism according to claim 1, wherein
    the convex portion and the concave portion of each concave-convex engaging section are respectively formed integrally with a corresponding member, out of the input member, the first bearing ring, and the output member.

16. The transmission ratio variable mechanism according to claim 15, wherein at least one of a base end section of the first convex portion and a base end section of the second convex portion, a relieving section for avoiding contact with a corresponding concave portion is arranged.

17. The transmission ratio variable mechanism according to claim 1, wherein the input member, the output member, and the first bearing ring are respectively annular shaped, and the first convex portion, the second convex portion, the first concave portion, and the second concave portion respectively extend toward a radial direction and have a progressively increasing width with respect to a circumferential direction from an inside of the radial direction to an outside thereof.

18. The transmission ratio variable mechanism according to claim 1, wherein the first convex portion and the first concave portion include first contact regions that come into contact with each other, the second convex portion and the second concave portion include second contact regions that come into contact with each other, and near the first contact regions and/or the second contact regions, lubricant holding sections are respectively arranged.

19. A motor vehicle steering system, comprising:

a transmission ratio variable mechanism according to claim 1;

a steering member coupled to the input member; and a turning mechanism coupled to the output member.

20. The motor vehicle steering system according to claim 19, further comprising a steering-assist-force imparting mechanism for imparting a steering assist force.

* * * * *